US011922961B2

(12) United States Patent
Ravelli et al.

(10) Patent No.: US 11,922,961 B2
(45) **Date of Patent: *Mar. 5, 2024**

(54) AUDIO DECODER, METHOD AND COMPUTER PROGRAM USING A ZERO-INPUT-RESPONSE TO OBTAIN A SMOOTH TRANSITION

(71) Applicant: Fraunhofer-Gesellschaft zur Foerderung der angewandten Forschung e.V., Munich (DE)

(72) Inventors: Emmanuel Ravelli, Erlangen (DE); Guillaume Fuchs, Bubenreuth (DE); Sascha Disch, Fuerth (DE); Markus Multrus, Nuremberg (DE); Grzegorz Pietrzyk, Nuremberg (DE); Benjamin Schubert, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 23 days.

This patent is subject to a terminal disclaimer.

(21) Appl. No.: 17/479,151

(22) Filed: Sep. 20, 2021

(65) Prior Publication Data

US 2022/0076685 A1 Mar. 10, 2022

Related U.S. Application Data

(63) Continuation of application No. 16/427,488, filed on May 31, 2019, now Pat. No. 11,170,797, which is a (Continued)

(30) Foreign Application Priority Data

Jul. 28, 2014 (EP) .................................... 14178830

(51) Int. Cl.
*G10L 19/00* (2013.01)
*G10L 19/02* (2013.01)
(Continued)

(52) U.S. Cl.
CPC .............. *G10L 19/20* (2013.01); *G10L 19/02* (2013.01); *G10L 19/12* (2013.01)

(58) Field of Classification Search
CPC .......... G10L 19/18; G10L 19/22; G10L 21/00
See application file for complete search history.

(56) References Cited

U.S. PATENT DOCUMENTS

| | | |
|---|---|---|
| 6,108,621 A | 8/2000 | Nishiguchi et al. |
| 6,134,518 A | 10/2000 | Cohen |

(Continued)

FOREIGN PATENT DOCUMENTS

| | | |
|---|---|---|
| AU | 2013200680 | 2/2013 |
| CA | 2188493 | 4/1997 |

(Continued)

OTHER PUBLICATIONS

ISO/IEC FDIS 23003-3:2011(E), "Information Technology—MPEG Audio Techology—MPEG Audio Technologies—Part 3: Unified Speech and Audio Coding", ISO/IEC JTC 1/SC 29/WG 11, Sep. 20, 2011.

(Continued)

*Primary Examiner* — Daniel Abebe
(74) *Attorney, Agent, or Firm* — Dicke, Billig & Czaja, PLLC

(57) ABSTRACT

An audio decoder for providing a decoded audio information on the basis of an encoded audio information includes a linear-prediction-domain decoder configured to provide a first decoded audio information on the basis of an audio frame encoded in a linear prediction domain, a frequency domain decoder configured to provide a second decoded (Continued)

audio information on the basis of an audio frame encoded in a frequency domain, and a transition processor. The transition processor is configured to obtain a zero-input-response of a linear predictive filtering, wherein an initial state of the linear predictive filtering is defined depending on the first decoded audio information and the second decoded audio information, and modify the second decoded audio information depending on the zero-input-response, to obtain a smooth transition between the first and the modified second decoded audio information.

18 Claims, 10 Drawing Sheets

Related U.S. Application Data continuation of application No. 15/416,052, filed on Jan. 26, 2017, now Pat. No. 10,325,611, which is a continuation of application No. PCT/EP2015/066953, filed on Jul. 23, 2015.

(51) Int. Cl.

| | |
|---|---|
| ***G10L 19/12*** | (2013.01) |
| ***G10L 19/20*** | (2013.01) |

(56) References Cited

U.S. PATENT DOCUMENTS

| | | | | |
|---|---|---|---|---|
| 6,963,842 | B2 | 11/2005 | Goodwin | |
| 7,406,410 | B2 | 7/2008 | Kikuiri | |
| 7,454,330 | B1 | 11/2008 | Nishiguchi et al. | |
| 8,515,767 | B2 | 8/2013 | Reznik | |
| 8,725,503 | B2 | 5/2014 | Bessette | |
| 8,744,843 | B2 | 6/2014 | Geiger et al. | |
| 8,744,863 | B2 | 6/2014 | Neuendorf et al. | |
| 9,489,962 | B2 | 11/2016 | Chong et al. | |
| 10,325,611 | B2 | 6/2019 | Ravelli et al. | |
| 10,839,814 | B2 * | 11/2020 | Atti | H04S 3/02 |
| 11,084,954 | B2 | 8/2021 | Wutti et al. | |
| 2003/0004711 | A1 | 1/2003 | Koishida | |
| 2003/0009325 | A1 | 1/2003 | Kirchherr | |
| 2005/0154584 | A1 | 7/2005 | Jelinek et al. | |
| 2006/0149537 | A1 | 7/2006 | Shiramizo | |
| 2006/0173605 | A1 | 8/2006 | Pfaeffle | |
| 2008/0027717 | A1 | 1/2008 | Rajendran et al. | |
| 2008/0172223 | A1 | 7/2008 | Oh et al. | |
| 2009/0187409 | A1 | 7/2009 | Krishman et al. | |
| 2009/0234644 | A1 | 9/2009 | Reznik et al. | |
| 2009/0299757 | A1 | 12/2009 | Guo et al. | |
| 2011/0119054 | A1 | 5/2011 | Lee et al. | |
| 2011/0153333 | A1 | 6/2011 | Bessette | |
| 2011/0173008 | A1 | 7/2011 | Lecomte et al. | |
| 2011/0173010 | A1 | 7/2011 | Lecomte et al. | |
| 2011/0200198 | A1 | 8/2011 | Grill et al. | |
| 2011/0202353 | A1 | 8/2011 | Neuendorf et al. | |
| 2012/0022880 | A1 | 1/2012 | Bessette | |
| 2012/0101813 | A1 | 4/2012 | Vaillancourt et al. | |
| 2012/0265541 | A1 | 10/2012 | Geiger et al. | |
| 2012/0271644 | A1 * | 10/2012 | Bessette | G10L 19/03 704/E19.035 |
| 2013/0030798 | A1 | 1/2013 | Mittal et al. | |
| 2013/0289981 | A1 | 10/2013 | Ragot et al. | |
| 2016/0293173 | A1 | 10/2016 | Faure et al. | |
| 2017/0133026 | A1 | 5/2017 | Ravelli et al. | |
| 2017/0270935 | A1 * | 9/2017 | Atti | G10L 19/167 |
| 2020/0160874 | A1 | 5/2020 | Ravelli | |

FOREIGN PATENT DOCUMENTS

| | | | |
|---|---|---|---|
| CN | 1187665 | | 7/1998 |
| CN | 1672192 | | 9/2005 |
| CN | 1705979 | | 12/2005 |
| CN | 1849648 | | 10/2006 |
| CN | 101025918 | | 8/2007 |
| CN | 101197134 | | 6/2008 |
| CN | 101256771 | | 9/2008 |
| CN | 101523486 | | 9/2009 |
| CN | 102089758 | | 6/2011 |
| CN | 102105930 | | 6/2011 |
| CN | 102150205 | | 8/2011 |
| CN | 102737642 | | 10/2012 |
| CN | 103282959 | | 9/2013 |
| CN | 103703512 | | 4/2014 |
| CN | 101836251 | | 9/2020 |
| EP | 0747884 | | 12/1996 |
| EP | 0966102 | | 12/1999 |
| JP | 2010-517083 | | 5/2010 |
| JP | 2017-504677 | | 2/2017 |
| RU | 2483365 | C2 | 7/2012 |
| RU | 2483366 | C2 | 5/2013 |
| WO | 2004/010416 | | 1/2004 |
| WO | 2005/027095 | | 3/2005 |
| WO | 2009/059333 | A1 | 5/2009 |
| WO | 2010/101190 | | 9/2010 |
| WO | 2011/042464 | A1 | 4/2011 |
| WO | 2011/048094 | A1 | 4/2011 |
| WO | 2013/168414 | | 1/2016 |

OTHER PUBLICATIONS

Parallel Korean Patent Application No. 10-2017-7004348 Office Action dated Sep. 17, 2018.

Jeremie Lecomte et al.: "Efficient Cross-Fade Windows for Transitions between LPC-based and non-LPC based audio coding": 126th AES Convention; May 2009; paper 7712.

Office Action in parallel Russian Application No. 2017106091 dated Feb. 12, 2018.

* cited by examiner

AUDIO DECODER, METHOD AND COMPUTER PROGRAM USING A ZERO-INPUT-RESPONSE TO OBTAIN A SMOOTH TRANSITION

CROSS-REFERENCE TO RELATED APPLICATIONS

This application is a continuation of copending U.S. patent application Ser. No. 16/427,488, filed May 31, 2019, which in turn is a continuation of copending U.S. patent application Ser. No. 15/416,052, filed Jan. 26, 2017, now U.S. Pat. No. 10,325,611, which in turn is a continuation of copending International Application No. PCT/EP2015/066953, filed Jul. 23, 2015, all of which are incorporated herein by reference in their entirety, and additionally claims priority from European Application No. EP 14 178 830.7, filed Jul. 28, 2014, incorporated herein by reference in its entirety.

An embodiment according to the invention is related to an audio decoder for providing a decoded audio information on the basis of an encoded audio information.

Another embodiment according to the invention is related to a method for providing a decoded audio information on the basis of an encoded audio information.

Another embodiment according to the invention is related to a computer program for performing said method.

In general, embodiments according to the invention are related to handling a transition from CELP codec to a MDCT-based codec in switched audio coding.

BACKGROUND OF THE INVENTION

In the last years there has been an increasing demand for transmitting and storing encoded audio information. There is also an increasing demand for an audio encoding and an audio decoding of audio signals comprising both speech and general audio (like, for example, music, background noise, and the like).

In order to improve the coding quality and also in order to improve a bitrate efficiency, switched (or switching) audio codecs have been introduced which switch between different coding schemes, such that, for example, a first frame is encoded using a first encoding concept (for example, a CELP-based coding concept), and such that a subsequent second audio frame is encoded using a different second coding concept (for example, an MDCT-based coding concept). In other words, there may be a switching between an encoding in a linear-prediction-coding domain (for example, using a CELP-based coding concept) and a coding in a frequency domain (for example, a coding which is based on a time-domain-to-frequency-domain transform or a frequency-domain-to-time-domain transform, like, for example, an FFT transform, an inverse FFT transform, an MDCT transform or an inverse MDCT transform). For example, the first coding concept may be a CELP-based coding concept, an ACELP-based coding concept, a transform-coded-excitation-linear-prediction-domain based coding concept, or the like. The second coding concept may, for example, be a FFT-based coding concept, a MDCT-based coding concept, an AAC-based coding concept or a coding concept which can be considered as a successor concept of the AAC-based coding concept.

In the following, some examples of conventional audio coders (encoders and/or decoders) will be described.

Switched audio codecs, like, for example, MPEG USAC, are based on two main audio coding schemes. One coding scheme is, for example, a CELP codec, targeted for speech signals. The other coding scheme is, for example, an MDCT-based codec (simply called MDCT in the following), targeted for all other audio signals (for example, music, background noise). On mixed content signals (for example, speech over music), the encoder (and consequently also the decoder) often switches between the two encoding schemes. It is then necessitated to avoid any artifacts (for example, a click due to a discontinuity) when switching from one mode (or encoding scheme) to another.

Switched audio codecs may, for example, comprise problems which are caused by CELP-to-MDCT transitions.

CELP-to-MDCT transitions generally introduce two problems. Aliasing can be introduced due to the missing previous MDCT frame. A discontinuity can be introduced at the border between the CELP frame and the MDCT frame, due to the non-perfect waveform coding nature of the two coding schemes operating at low/medium bitrates.

Several approaches already exist to solve the problems introduced by the CELP-to-MDCT transitions, and will be discussed in the following.

A possible approach is described in the article "Efficient cross-fade windows for transitions between LPC-based and non-LPC based audio coding" by Jeremie Lecomte, Philippe Gournay, Ralf Geiger, Bruno Bessette and Max Neuendorf (presented at the 126-th AES Convention, May 2009, paper 771). This article describes an approach in section 4.4.2 "ACELP to non-LPD mode". Reference is also made, for example, to FIG. 8 of said article. The aliasing problem is solved first by increasing the MDCT length (here from 1024 to 1152) such that the MDCT left folding point is moved at the left of the border between the CELP and the MDCT frames, then by changing the left-part of the MDCT window such that the overlap is reduced, and finally by artificially introducing the missing aliasing using the CELP signal and an overlap-and-add operation. The discontinuity problem is solved at the same time by the overlap-and-add operation.

This approach works well but has the disadvantage to introduce a delay in the CELP decoder, the delay being equal to the overlap length (here: 128 samples).

Another approach is described in U.S. Pat. No. 8,725,503 B2, dated May 13, 2014 and titled "Forward time domain aliasing cancellation with application in weighted or original signal domain" by Bruno Bessette.

In this approach, the MDCT length is not changed (nor the MDCT window shape). The aliasing problem is solved here by encoding the aliasing correction signal with a separate transform-based encoder. Additional side-information bits are sent into the bitstream. The decoder reconstructs the aliasing correction signal and adds it to the decoded MDCT frame. Additionally, the zero input response (ZIR) of the CELP synthesis filter is used to reduce the amplitude of the aliasing correction signal and to improve the coding efficiency. The ZIR also helps to reduce significantly the discontinuity problem.

This approach also works well but the disadvantage is that it necessitates a significant amount of additional side-information and the number of bits necessitated is generally variable which is not suitable for a constant-bitrate codec.

Another approach is described in US patent application US 2013/0289981 A1 dated Oct. 31, 2013 and titled "Low-delay sound-encoding alternating between predictive encoding and transform encoding" by Stephane Ragot, Balazs Kovesi and Pierre Berthet. According to said approach, the MDCT is not changed, but the left-part of the MDCT window is changed in order to reduce the overlap length. To solve the aliasing problem, the beginning of the MDCT frame is coded using a CELP codec, and then the CELP signal is used to cancel the aliasing, either by replacing completely the MDCT signal or by artificially introducing the missing aliasing component (similarly to the above mentioned article by Jeremie Lecomte et al.). The discontinuity problem is solved by the overlap-add operation if an approach similar to the article by Jeremie Lecomte et al. is used, otherwise it is solved by a simple cross-fade operation between the CELP signal and the MDCT signal.

Similarly to U.S. Pat. No. 8,725,503 B2, this approach generally works well but the disadvantage is that it necessitates a significant amount of side-information, introduced by the additional CELP.

In view of the above described conventional solutions, there is a desire to have a concept which comprises improved characteristics (for example, an improved tradeoff between bitrate overhead, delay and complexity) for switching between different coding modes.

SUMMARY

According to an embodiment, an audio decoder for providing a decoded audio information on the basis of an encoded audio information may have: a linear-prediction-domain decoder configured to provide a first decoded audio information on the basis of an audio frame encoded in a linear prediction domain; a frequency domain decoder configured to provide a second decoded audio information on the basis of an audio frame encoded in a frequency domain; and a transition processor, wherein the transition processor is configured to obtain a zero-input-response of a linear predictive filtering, wherein an initial state of the linear predictive filtering is defined in dependence on the first decoded audio information and the second decoded audio information, and wherein the transition processor is configured to modify the second decoded audio information, which is provided on the basis of an audio frame encoded in the frequency domain following an audio frame encoded in the linear prediction domain, in dependence on the zero-input-response, to obtain a smooth transition between the first decoded audio information and the modified second decoded audio information.

According to another embodiment, a method for providing a decoded audio information on the basis of an encoded audio information may have the steps of: providing a first decoded audio information on the basis of an audio frame encoded in a linear prediction domain; providing a second decoded audio information on the basis of an audio frame encoded in a frequency domain; and obtaining a zero-input-response of a linear predictive filtering, wherein an initial state of the linear predictive filtering is defined in dependence on the first decoded audio information and the second decoded audio information, and modifying the second decoded audio information, which is provided on the basis of an audio frame encoded in the frequency domain following an audio frame encoded in the linear prediction domain, in dependence on the zero-input-response, to obtain a smooth transition between the first decoded audio information and the modified second decoded audio information.

Another embodiment may have a non-transitory digital storage medium having a computer program stored thereon to perform the method for providing a decoded audio information on the basis of an encoded audio information, the method having the steps of: providing a first decoded audio information on the basis of an audio frame encoded in a linear prediction domain; providing a second decoded audio information on the basis of an audio frame encoded in a frequency domain; and obtaining a zero-input-response of a linear predictive filtering, wherein an initial state of the linear predictive filtering is defined in dependence on the first decoded audio information and the second decoded audio information, and modifying the second decoded audio information, which is provided on the basis of an audio frame encoded in the frequency domain following an audio frame encoded in the linear prediction domain, in dependence on the zero-input-response, to obtain a smooth transition between the first decoded audio information and the modified second decoded audio information when said computer program is run by a computer.

An embodiment according to the invention creates an audio decoder for providing a decoded audio information on the basis of an encoded audio information. The audio decoder comprises a linear-prediction-domain decoder configured to provide a first decoded audio information on the basis of an audio frame encoded in the linear-prediction domain and a frequency domain decoder configured to provide a second decoded audio information on the basis of an audio frame encoded in the frequency domain. The audio decoder also comprises a transition processor. The transition processor is configured to obtain a zero-input response of a linear predictive filtering, wherein an initial state of the linear predictive filtering is defined in dependence on the first decoded audio information and the second decoded audio information. The transition processor is also configured to modify the second decoded audio information, which is provided on the basis of an audio frame encoded in the frequency domain following an audio frame encoded in the linear-prediction domain, in dependence on the zero-input response, to obtain a smooth transition between the first decoded audio information and the modified second decoded audio information.

This audio decoder is based on the finding that a smooth transition between an audio frame encoded in the linear-prediction-domain and a subsequent audio frame encoded in the frequency domain can be achieved by using a zero-input response of a linear predictive filter to modify the second decoded audio information, provided that the initial state of the linear predictive filtering considers both the first decoded audio information and the second decoded audio information. Accordingly, the second decoded audio information can be adapted (modified) such that the beginning of the modified second decoded audio information is similar to the ending of the first decoded audio information, which helps to reduce, or even avoid, substantial discontinuities between the first audio frame and the second audio frame. When compared to the audio decoder described above, the concept is generally applicable even if the second decoded audio information does not comprise any aliasing. Moreover, it should be noted that the term "linear predictive filtering" may both designate a single application of a linear predictive filter and multiple applications of linear predictive filters, wherein it should be noted that a single application of a linear predictive filtering is typically equivalent to multiple applications of identical linear predictive filters, because the linear predictive filters are typically linear.

To conclude, the above mentioned audio decoder allows to obtain a smooth transition between a first audio frame encoded in a linear prediction domain and a subsequent second audio frame encoded in the frequency domain (or transform domain), wherein no delay is introduced, and wherein a computation effort is comparatively small.

Another embodiment according to the invention creates an audio decoder for providing a decoded audio information on the basis of an encoded audio information. The audio decoder comprises a linear-prediction domain decoder configured to provide a first decoded audio information on the basis of an audio frame encoded in a linear-prediction domain (or, equivalently, in a linear-prediction-domain representation). The audio decoder also comprises a frequency domain decoder configured to provide a second decoded audio information on the basis of an audio frame encoded in a frequency domain (or, equivalently, in a frequency domain representation). The audio decoder also comprises a transition processor. The transition processor is configured to obtain a first zero-input-response of a linear predictive filter in response to a first initial state of the linear predictive filter defined by the first decoded audio information, and to obtain a second zero-input-response of the linear predictive filter in response to a second initial state of the linear predictive filter defined by a modified version of the first decoded audio information, which is provided with an artificial aliasing, and which comprises a contribution of a portion of the second decoded audio information. Alternatively, the transition processor is configured to obtain a combined zero-input-response of the linear predictive filter in response to an initial state of the linear predictive filter defined by a combination of the first decoded audio information and of a modified version of the first decoded audio information which is provided with an artificial aliasing, and which comprises a contribution of a portion of the second decoded audio information. The transition processor is also configured to modify the second decoded audio information, which is provided on the basis of an audio frame encoded in the frequency domain following an audio frame encoded in the linear prediction domain, in dependence on the first zero-input-response and the second zero-input-response, or in dependence on the combined zero-input-response, to obtain a smooth transition between the first decoded audio information and the modified second decoded audio information.

This embodiment according to the invention is based on the finding that a smooth transition between an audio frame encoded in the linear-prediction-domain and a subsequent audio frame encoded in the frequency domain (or, generally, in the transform domain) can be obtained by modifying the second decoded audio information on the basis of a signal which is a zero-input-response of a linear predictive filter, an initial state of which is defined both by the first decoded audio information and the second decoded audio information. An output signal of such a linear predictive filter can be used to adapt the second decoded audio information (for example, an initial portion of the second decoded audio information, which immediately follows the transition between the first audio frame and the second audio frame), such that there is a smooth transition between the first decoded audio information (associated with an audio frame encoded in the linear-prediction-domain) and the modified second decoded audio information (associated with an audio frame encoded in the frequency domain or in the transform domain) without the need to amend the first decoded audio information.

It has been found that the zero-input response of the linear predictive filter is well-suited for providing a smooth transition because the initial state of the linear predictive filter is based both on the first decoded audio information and the second decoded audio information, wherein an aliasing included in the second decoded audio information is compensated by the artificial aliasing, which is introduced into the modified version of the first decoded audio information.

Also, it has been found that no decoding delay is necessitated by modifying the second decoded audio information on the basis of the first zero-input response and the second zero-input response, or in dependence on the combined zero-input response, while leaving the first decoded audio information unchanged, because the first zero-input response and the second zero-input response, or the combined zero-input response, are very well-adapted to smoothen the transition between the audio frame encoded in the linear-prediction-domain and subsequent audio frame encoded in the frequency domain (or transform domain) without changing the first decoded audio information, since the first zero-input response and the second zero-input response, or the combined zero-input response, modify the second decoded audio information such that the second decoded audio information is substantially similar to the first decoded audio information at least at the transition between the audio frame encoded in the linear-prediction domain and the subsequent audio frame encoded in the frequency domain.

To conclude, the above described embodiment according to the present invention allows to provide a smooth transition between an audio frame encoded in the linear-prediction-coding domain and a subsequent audio frame encoded in the frequency domain (or transform domain), wherein an introduction of additional delay is avoided since only the second decoded audio information (associated with the subsequent audio frame encoded in the frequency domain) is modified, and wherein a good quality of the transition (without substantial artifacts) can be achieved by usage of the first zero-input response and the second zero-input response, or the combined zero-input response, which results in the consideration of both first decoded audio information and the second audio information.

In an embodiment, the frequency domain decoder is configured to perform an inverse lapped transform, such that the second decoded audio information comprises an aliasing. It has been found that the above inventive concepts work particularly well even in the case that the frequency domain decoder (or transform domain decoder) introduces aliasing. It has been found that said aliasing can be canceled with moderate effort and good results by the provision of an artificial aliasing in the modified version of the first decoded audio information.

In an embodiment, the frequency domain decoder is configured to perform an inverse lapped transform, such that the second decoded audio information comprises an aliasing in a time portion which is temporally overlapping with a time portion for which the linear-prediction-domain decoder provides the first decoded audio information, and such that the second decoded audio information is aliasing-free for a time portion following the time portion for which the linear-prediction-domain decoder provides the first decoded audio information. This embodiment according to the invention is based on the idea that it is advantageous to use a lapped transform (or an inverse lapped transform) and a windowing which keeps the time portion, for which no first decoded audio information is provided, aliasing-free. It has been found that the first zero-input response and the second zero-input response, or the combined zero-input response, can be provided with small computational effort if it is not necessary to provide an aliasing cancellation information for a time for which there is no first decoded audio information provided. In other words, it is advantageous to provide the first zero-input response and the second zero-input response, or the combined zero-input response, on the basis of an initial state in which initial state the aliasing is substantially canceled (for example, using the artificial aliasing). Consequently, the first zero-input response and the second zero-input response, or the combined zero-input response, are substantially aliasing-free, such that it is desirable to have no aliasing within the second decoded audio information for the time period following the time period for which the linear-prediction-domain decoder provides the first decoded audio information. Regarding this issue, it should be noted that the first zero-input response and the second zero-input response, or the combined zero-input response, are typically provided for said time period following the time period for which the linear-prediction-domain decoder provides the first decoded audio information (since the first zero-input response and the second zero-input response, or the combined zero-input response, are substantially a decaying continuation of the first decoded audio information, taking into consideration the second decoded audio information and, typically, the artificial aliasing which compensates for the aliasing included in the second decoded audio information for the "overlapping" time period.

In an embodiment, the portion of the second decoded audio information, which is used to obtain the modified version of the first decoded audio information, comprises an aliasing. By allowing some aliasing within the second decoded audio information, a windowing can be kept simple and an excessive increase of the information needed to encode the audio frame encoded in the frequency domain can be avoided. The aliasing, which is included in the portion of the second decoded audio information which is used to obtain the modified version of the first decoded audio information can be compensated by the artificial aliasing mentioned above, such that there is no severe degradation of the audio quality.

In an embodiment, the artificial aliasing, which is used to obtain the modified version of the first decoded audio information, at least partially compensates an aliasing which is included in the portion of the second decoded audio information, which is used to obtain the modified version of the first decoded audio information. Accordingly, a good audio quality can be obtained.

In an embodiment, the transition processor is configured to apply a first windowing to the first decoded audio information, to obtain a windowed version of the first decoded audio information, and to apply a second windowing to a time-mirrored version of the first decoded audio information, to obtain a windowed version of the time-mirrored version of the first decoded audio information. In this case, the transition processor may be configured to combine the windowed version of the first decoded audio information and the windowed version of the time-mirrored version of the first decoded audio information, in order to obtain the modified version of the first decoded audio information. This embodiment according to the invention is based on the idea that some windowing should be applied in order to obtain a proper cancellation of aliasing in the modified version of the first decoded audio information, which is used as an input for the provision of the zero-input response. Accordingly, it can be achieved that the zero-input response (for example, the second zero-input response or the combined zero-input response) are very well-suited for a smoothing of the transition between the audio information encoded in the linear-prediction-coding domain and the subsequent audio frame encoded in the frequency domain.

In an embodiment, the transition processor is configured to linearly combine the second decoded audio information with the first zero-input-response and the second zero-input-response, or with the combined zero-input-response, for a time portion for which no first decoded audio information is provided by the linear-prediction-domain decoder, in order to obtain the modified second decoded audio information. It has been found that a simple linear combination (for example, a simple addition and/or subtraction, or a weighted linear combination, or a cross-fading linear combination), are well-suited for the provision of a smooth transition.

In an embodiment, the transition processor is configured to leave the first decoded audio information unchanged by the second decoded audio information when providing a decoded audio information for an audio frame encoded in a linear-prediction domain, such that the decoded audio information provided for an audio frame encoded in the linear-prediction-domain is provided independent from decoded audio information provided for a subsequent audio frame encoded in the frequency domain. It has been found that the concept according to the present invention does not necessitate to change the first decoded audio information on the basis of the second decoded audio information in order to obtain a sufficiently smooth transition. Thus, by leaving the first decoded audio information unchanged by the second decoded audio information, a delay can be avoided, since the first decoded audio information can consequently be provided for rendering (for example, to a listener) even before the decoding of the second decoded audio information (associated with the subsequent audio frame encoded in the frequency domain) is completed. In contrast, the zero-input response (first and second zero-input response, or combined zero-input response) can be computed as soon the second decoded audio information is available. Thus, a delay can be avoided.

In an embodiment, the audio decoder is configured to provide a fully decoded audio information for an audio frame encoded in the linear-prediction domain, which is followed by an audio frame encoded in the frequency domain, before decoding (or before completing the decoding) of the audio frame encoded in the frequency domain. This concept is possible due to the fact that the first decoded audio information is not modified on the basis of the second decoded audio information and helps to avoid any delay.

In an embodiment, the transition processor is configured to window the first zero-input response and the second zero-input response, or the combined zero-input-response, before modifying the second decoded audio information in dependence on the windowed first zero-input-response and the windowed second zero-input-response, or in dependence on the windowed combined zero-input-response. Accordingly, the transition can be made particularly smooth. Also, any problems which would result from a very long zero-input response, can be avoided.

In an embodiment, the transition processor is configured to window the first zero-input response and the second zero-input response, or the combined zero-input response, using a linear window. It has been found that the usage of a linear-window is a simple concept which nevertheless brings along a good hearing impression.

An embodiment according to the invention creates a method for providing a decoded audio information on the basis of an encoded audio information. The method comprises performing a linear-prediction-domain decoding to provide a first decoded audio information on the basis of an audio frame encoded in a linear prediction domain. The method also comprises performing a frequency domain decoding to provide a second decoded audio information on the basis of an audio frame encoded in a frequency domain. The method also comprises obtaining a first zero-input response of a linear predictive filtering in response to a first initial state of the linear predictive filtering defined by the first decoded audio information and obtaining a second zero-input-response of the linear predictive filtering in response to a second initial state of the linear predictive filtering defined by a modified version of the first decoded audio information, which is provided with an artificial aliasing, and which comprises a contribution of a portion of the second decoded audio information. Alternatively, the method comprises obtaining a combined zero-input response of the linear predictive filtering in response to an initial state of the linear predictive filtering defined by a combination of the first decoded audio information and of a modified version of the first decoded audio information, which is provided with an artificial aliasing, and which comprises a contribution of a portion of the second decoded audio information. The method further comprises modifying the second decoded audio information, which is provided on the basis of an audio frame encoded in the frequency domain following an audio frame encoded in the linear-prediction-domain, in dependence on the first zero-input response and the second zero-input response, or in dependence on the combined zero-input response, to obtain a smooth transition between the first decoded audio information and the modified second decoded audio information. This method is based on similar considerations as the above described audio decoder and brings along the same advantages.

Another embodiment according to an invention creates a computer program for performing said method when the computer program runs on a computer.

Another embodiment according to the invention creates a method for providing a decoded audio information on the basis of an encoded audio information. The method comprises providing a first decoded audio information on the basis of an audio frame encoded in a linear-prediction-domain. The method also comprises providing a second decoded audio information on the basis of an audio frame encoded in a frequency domain. The method also comprises obtaining a zero-input response of a linear predictive filtering, wherein an initial state of the linear predictive filtering is defined in dependence on the first decoded audio information and the second decoded audio information. The method also comprises modifying the second decoded audio information, which is provided on the basis of an audio frame encoded in the frequency domain following an audio frame encoded in the linear-prediction-domain, in dependence on the zero-input response, to obtain a smooth transition between the first decoded audio information and the modified second decoded audio information.

This method is based on the same considerations as the above described audio decoder.

Another embodiment according to the invention comprises a computer program for performing said method.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
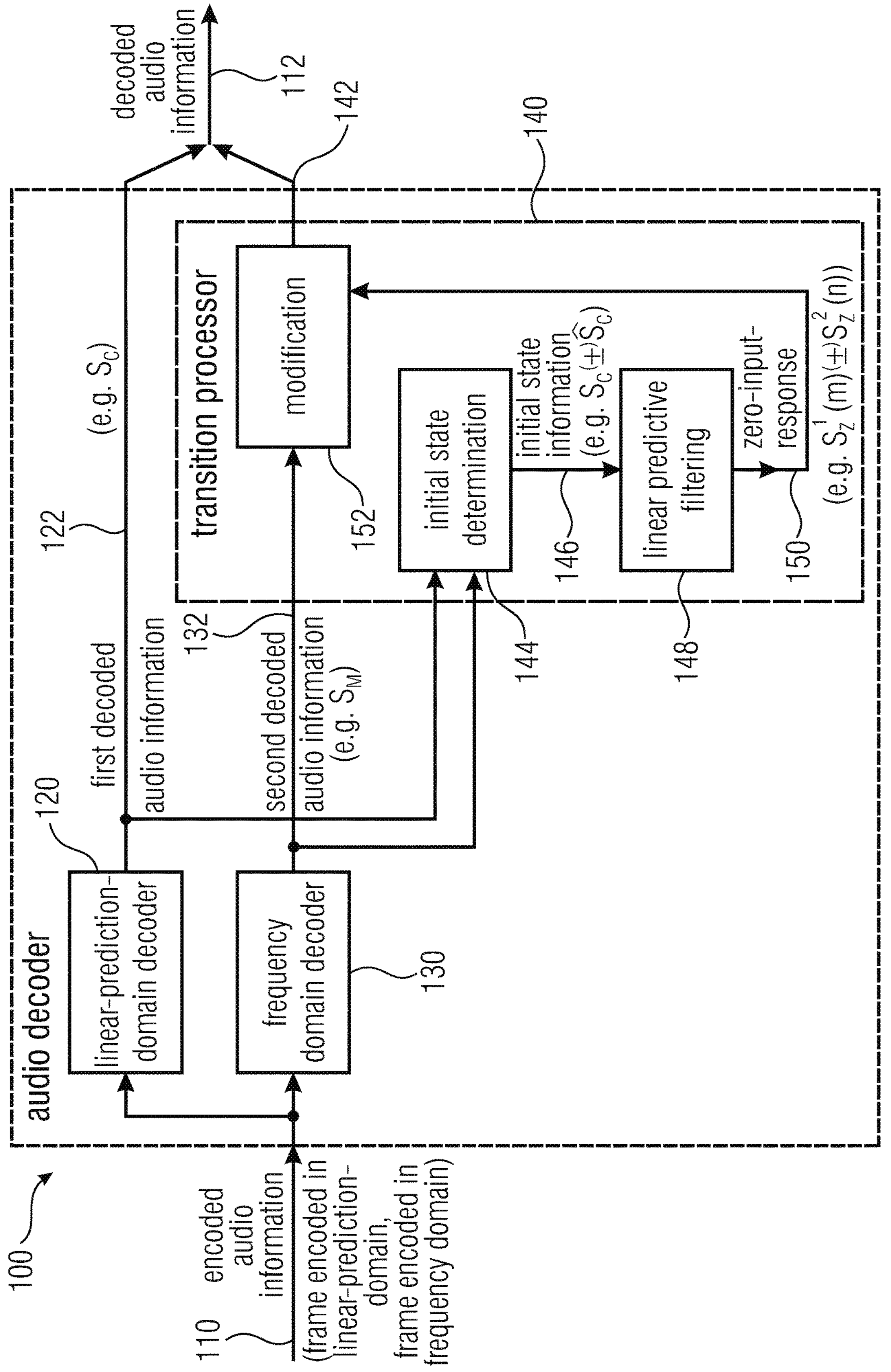
FIG. 1 shows a block schematic diagram of an audio decoder according to an embodiment of the present invention.

Audio Decoder According to FIG. 1

FIG. 1 shows a block schematic diagram of an audio decoder 100, according to an embodiment of the present invention. The audio encoder 100 is configured to receive an encoded audio information 110, which may, for example, comprise a first frame encoded in a linear-prediction domain and a subsequent second frame encoded in a frequency domain. The audio decoder 100 is also configured to provide a decoded audio information 112 on the basis of the encoded audio information 110.

The audio decoder 100 comprises a linear-prediction-domain decoder 120, which is configured to provide a first decoded audio information 122 on the basis of an audio frame encoded in the linear-prediction-domain. The audio decoder 100 also comprises a frequency domain decoder (or transform domain decoder 130), which is configured to provide a second decoded audio information 132 on the basis of an audio frame encoded in the frequency domain (or in the transform domain). For example, the linear-prediction-domain decoder 120 may be a CELP decoder, an ACELP decoder, or a similar decoder which performs a linear predictive filtering on the basis of an excitation signal and on the basis of encoded representation of the linear predictive filter characteristics (or filter coefficients).

The frequency domain decoder 130 may, for example, be an AAC-type decoder or any decoder which is based on the AAC-type decoding. For example, the frequency domain decoder (or transform domain decoder) may receive an encoded representation of frequency domain parameters (or transform domain parameters) and provide, on the basis thereof, the second decoded audio information. For example, the frequency domain decoder 130 may decode the frequency domain coefficients (or transform domain coefficients), scale the frequency domain coefficients (or transform domain coefficients) in dependence on scale factors (wherein the scale factors may be provided for different frequency bands, and may be represented in different forms) and perform a frequency-domain-to-time-domain conversion (or transform-domain-to-time-domain conversion) like, for example, an inverse Fast-Fourier-Transform or an inverse modified-discrete-cosine-transform (inverse MDCT).

The audio decoder 100 also comprises a transition processor 140. The transition processor 140 is configured to obtain a zero-input response of a linear predictive filtering, wherein an initial state of the linear predictive filtering is defined in dependence on the first decoded audio information and the second decoded audio information. Moreover, the transition processor 140 is configured to modify the second decoded audio information 132, which is provided on the basis of an audio frame encoded in the frequency domain following an audio frame encoded in the linear prediction domain, in dependence on the zero-input response, to obtain a smooth transition between the first decoded audio information and the modified second decoded audio information.

For example, the transition processor 140 may comprise an initial state determination 144, which receives the first decoded audio information 122 and the second decoded audio information 132 and which provides, on the basis thereof, an initial state information 146. The transition processor 140 also comprises a linear predictive filtering 148, which receives the initial state information 146 and which provides, on the basis thereof, a zero-input response 150. For example, the linear predictive filtering may be performed by a linear predictive filter, which is initialized on the basis of the initial state information 146 and provided with a zero-input. Accordingly, the linear predictive filtering provides the zero-input response 150. The transition processor 140 also comprises a modification 152, which modifies the second decoded audio information 132 in dependence on the zero-input response 150, to thereby obtain a modified second decoded audio information 142, which constitutes an output information of the transition processor 140. The modified second decoded audio information 142 is typically concatenated with the first decoded audio information 122, to obtain the decoded audio information 112.

Regarding the functionality of the audio decoder 100, the case should be considered in which an audio frame encoded in the linear-prediction-domain (first audio frame) is followed by an audio frame encoded in the frequency domain (second audio frame). The first audio frame, encoded in the linear-prediction-domain, will be decoded by the linear-prediction-domain decoder 120. Accordingly, the first decoded audio information 122 is obtained, which is associated with the first audio frame. However, the decoded audio information 122 associated with the first audio frame is typically left unaffected by any audio information decoded on the basis of the second audio frame, which is encoded in the frequency domain. However, the second decoded audio information 132 is provided by the frequency domain decoder 130 on the basis of the second audio frame which is encoded in the frequency domain.

Unfortunately, the second decoded audio information 132, which is associated with the second audio frame, typically does not comprise a smooth transition with the first decoded audio information 122 which is associated with the first decoded audio information.

However, it should be noted that the second decoded audio information is provided for a period of time which also overlaps with the period of time associated with the first audio frame. The portion of the second decoded audio information, which is provided for a time of the first audio frame (i.e. an initial portion of the second decoded audio information 132) is evaluated by the initial state determination 144. Moreover, the initial state determination 144 also evaluates at least a portion of the first decoded audio information. Accordingly, the initial state determination 144 obtains the initial state information 146 on the basis of a portion of the first decoded audio information (which portion is associated with the time of the first audio frame) and on the basis of a portion of the second decoded audio information (which portion of the second decoded audio information 130 is also associated with the time of the first audio frame). Accordingly, the initial state information 146 is provided in dependence on the first decoded information 132 and also in dependence on the second decoded audio information.

It should be noted that the initial state information 146 can be provided as soon as the second decoded audio information 132 (or at least an initial portion thereof necessitated by the initial state determination 144) is available. The linear predictive filtering 148 can also be performed as soon as the initial state information 146 is available, since the linear predictive filtering uses filtering coefficients which are already known from the decoding of the first audio frame. Accordingly, the zero-input response 150 can be provided as soon as the second decoded audio information 132 (or at least the initial portion thereof necessitated by the initial state determination 144) is available. Moreover, the zero-input response 150 can be used to modify that part of the second decoded audio information 132 which is associated with the time of the second audio frame (rather than with the time of the first audio frame). Accordingly, a portion of the second decoded audio information, which typically lies at the beginning of the time associated with the second audio frame, is modified. Consequently, a smooth transition between the first decoded audio information 122 (which typically ends at the end of the time associated with the first audio frame) and the modified second decoded audio information 142 is achieved (wherein the time portion of the second decoded audio information 132 having times which are associated with the first audio frame may be discarded, and may therefore only be used for the provision of the initial state information for the linear predictive filtering). Accordingly, the overall decoded audio information 112 can be provided with no delay, since a provision of the first decoded audio information 122 is not delayed (because the first decoded audio information 122 is independent from the second decoded audio information 132), and because the modified second decoded audio information 142 can be provided as soon as the second decoded audio information 132 is available. Accordingly, smooth transitions between the different audio frames can be achieved within the decoded audio information 112, even though there is a switching from an audio frame encoded in the linear prediction domain (first audio frame) towards an audio frame encoded in the frequency domain (second audio frame).

However, it should be noted that the audio decoder 100 can be supplemented by any of the features and functionalities described herein.

Figure 2:
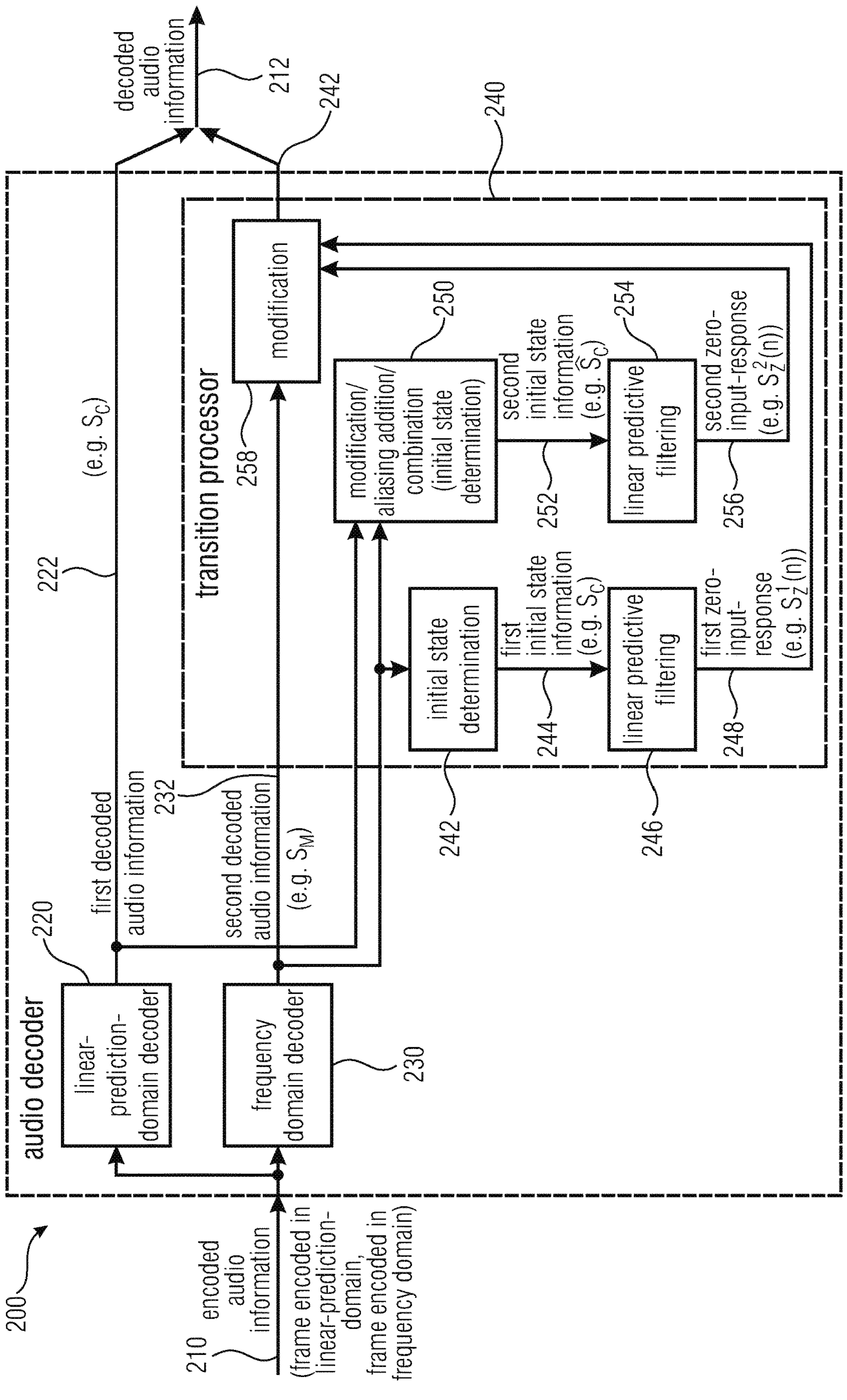
FIG. 2 shows a block schematic diagram of an audio decoder, according to another embodiment of the present invention.

Audio Decoder According to FIG. 2

FIG. 2 shows a block schematic diagram of an audio decoder, according to another embodiment of the present invention. The audio decoder 200 is configured to receive an encoded audio information 210, which may, for example, comprise one or more frames encoded in the linear-prediction-domain (or equivalently, in a linear-prediction domain representation), and one or more audio frames encoded in the frequency domain (or, equivalently, in a transform domain, or equivalently in a frequency domain representation, or equivalently in a transform domain representation). The audio decoder 200 is configured to provide a decoded audio information 212 on the basis of the encoded audio information 210, wherein the decoded audio information 212 may, for example, be in a time domain representation.

The audio decoder 200 comprises a linear-prediction-domain decoder 220, which is substantially identical to the linear-prediction-domain decoder 120, such that the above explanations apply. Thus, the linear-prediction-domain decoder 210 receives audio frames encoded in a linear-prediction-domain representation which are included in the encoded audio information 210, and provides, on the basis of an audio frame encoded in the linear-prediction-domain representation, a first decoded audio information 222, which is typically in the form of a time domain audio representation (and which typically corresponds to the first decoded audio information 122). The audio decoder 200 also comprises a frequency domain decoder 230, which is substantially identical to the frequency decoder 130, such that the above explanations apply. Accordingly, the frequency domain decoder 230 receives an audio frame encoded in a frequency domain representation (or in a transform domain representation) and provides, on the basis thereof, a second decoded audio information 232, which is typically in the form of a time domain representation.

The audio decoder 200 also comprises a transition processor 240, which is configured to modify the second decoded audio information 232, to thereby derive a modified second decoded audio information 242.

The transition processor 240 is configured to obtain a first zero-input response of a linear predictive filter in response to an initial state of the linear predictive filter defined by the first decoded audio information 222. The transition processor is also configured to obtain a second zero-input response of the linear predictive filter in response to a second initial state of the linear predictive filter defined by a modified version of the first decoded audio information, which is provided with an artificial aliasing and which comprises a contribution of a portion of the second decoded audio information 232. For example, the transition processor 240 comprises an initial state determination 242, which receives the first decoded audio information 222 and which provides a first initial state information 244 on the basis thereof. For example, the first initial state information 244 may simply reflect a portion of the first decoded audio information 222, for example a portion which is adjacent to an end of the time portion associated to the first audio frame. The transition processor 240 may also comprise a (first) linear predictive filtering 246, which is configured to receive the first initial state information 244 as an initial linear predictive filter state and to provide, on the basis of the first initial state information 244, a first zero-input response 248. The transition processor 240 also comprises a modification/aliasing addition/combination 250, which is configured to receive the first decoded audio information 222, or at least a portion thereof (for example, a portion which is adjacent to an end of a time portion associated with the first audio frame), and also the second decoded information 232, or at least a portion thereof (for example, a time portion of the second decoded audio information 232 which is temporally arranged at an end of a time portion associated with the first audio frame, wherein the second decoded audio information is provided, for example, mainly for a time portion associated with the second audio frame, but also to some degree, for an end of the time portion associated with the first audio frame which is encoded in the linear-prediction domain representation). The modification/aliasing addition/combination may, for example, modify the time portion of the first decoded audio information, add an artificial aliasing on the basis of the time portion of the first decoded audio information, and also add the time portion of the second decoded audio information, to thereby obtain a second initial state information 252. In other words, the modification/aliasing addition/combination may be part of a second initial state determination. The second initial state information determines an initial state of a second linear predictive filtering 254, which is configured to provide a second zero-input response 256 on the basis of the second initial state information.

For example, the first linear predictive filtering and the second linear predictive filtering may use a filter setting (for example, filter coefficients), which are provided by the linear-prediction-domain decoder 220 for the first audio frame (which is encoded in the linear-predication-domain representation). In other words, the first and second linear predictive filtering 246, 254 may perform the same linear predictive filtering which is also performed by the linear prediction domain decoder 220 to obtain the first decoded audio information 222 associated with the first audio frame. However, initial states of the first and second linear predictive filtering 246, 254 may be set to the values determined by the first initial state determination 244 and by the second initial state determination 250 (which comprises the modification/aliasing addition/combination). However, an input signal of the linear predictive filters 246, 254 may be set to zero. Accordingly, the first zero-input response 248 and the second zero-input response 256 are obtained such that the first zero-input response and the second zero-input response are based on the first decoded audio information and the second decoded audio information, and are shaped using the same linear predictive filter which is used by the linear-prediction domain decoder 220.

The transition processor 240 also comprises a modification 258, which receives the second encoded audio information 232 and modifies the second decoded audio information 232 in dependence on the first zero-input response 248 and in dependence on the second zero-input response 256, to thereby obtain the modified second decoded audio information 242. For example, the modification 258 may add and/or subtract the first zero-input response 248 to or from the second decoded audio information 232, and may add or subtract the second zero-input response 256 to or from the second decoded audio information, to obtain the modified second decoded audio information 242.

For example, the first zero-input response and the second zero-input response may be provided for a time period which is associated to the second audio frame, such that only the portion of the second decoded audio information which is associated with the time period of the second audio frame is modified. Moreover, the values of the second decoded audio information 232 which are associated with a time portion which is associated with a first audio frame may be discarded in the final provision of the modified second decoded audio information (on the basis of the zero input responses).

Moreover, audio decoder 200 may be configured to concatenate the first decoded audio information 222 and the modified second decoded audio information 242, to thereby obtain the overall decoded audio information 212.

Regarding the functionality of the audio decoder 200, reference is made to the above explanations of the audio decoder 100. Moreover, additional details will be described in the following, taking reference to the other figures.

Figure 3:
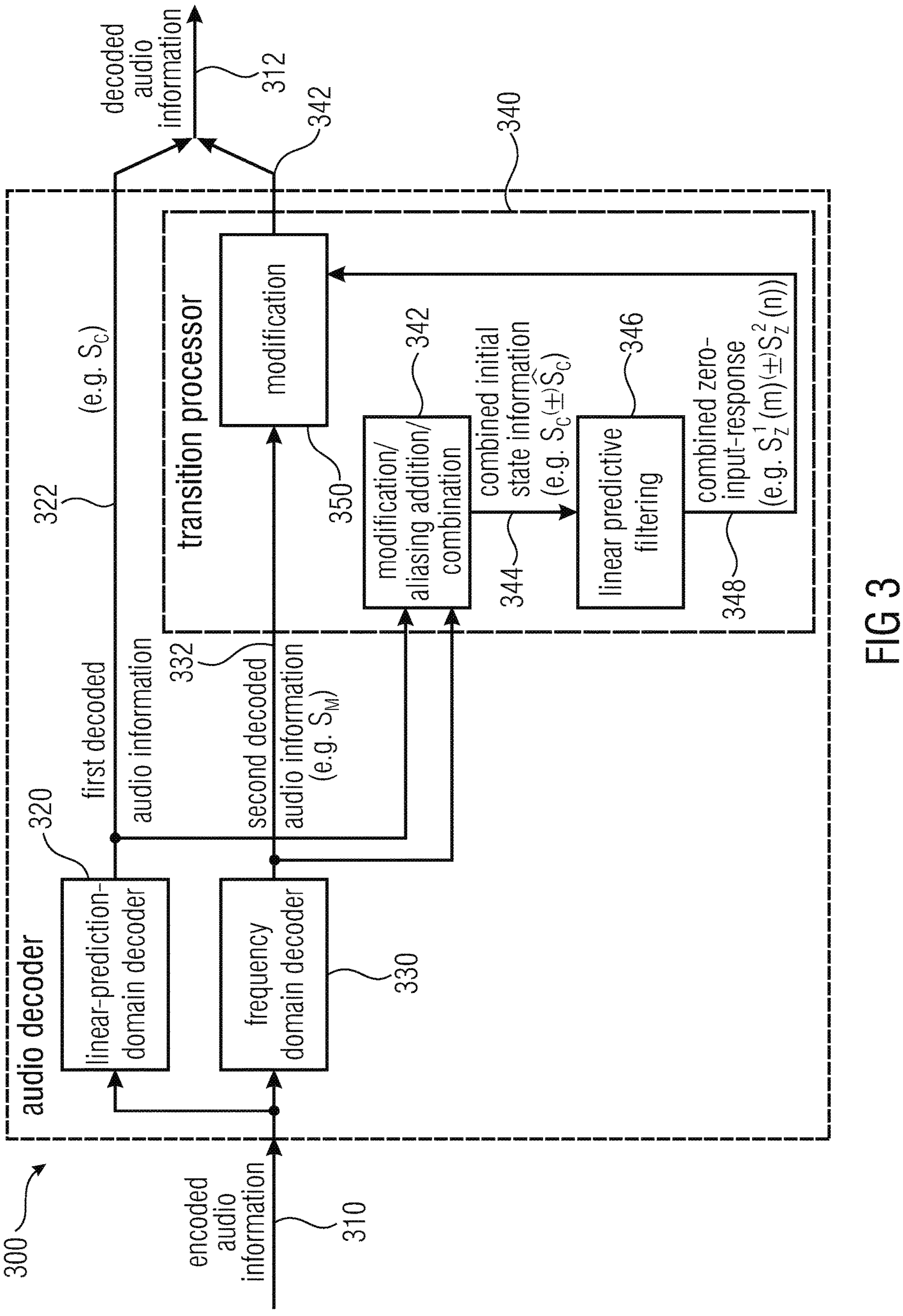
FIG. 3 shows a block schematic diagram of an audio encoder, according to another embodiment of the present invention.

Audio Decoder According to FIG. 3

FIG. 3 shows a block schematic diagram of an audio decoder 300, according to an embodiment of the present invention. The audio decoder 300 is similar to the audio decoder 200, such that only the differences will be described in detail. Otherwise, reference is made to the above explanations put forward with respect to the audio decoder 200.

The audio decoder 300 is configured to receive an encoded audio information 310, which may correspond to the encoded audio information 210. Moreover, the audio decoder 300 is configured to provide a decoded audio information 312, which may correspond to the decoded audio information 212.

The audio decoder 300 comprises a linear-prediction-domain decoder 320, which may correspond to the linear-prediction-domain decoder 220, and a frequency domain decoder 330, which corresponds to the frequency domain decoder 230. The linear-prediction-domain decoder 320 provides first decoded audio information 322, for example on the basis of a first audio frame which is encoded in the linear-prediction domain. Moreover, the frequency domain audio decoder 330 provides a second decoded audio information 332, for example on the basis of a second audio frame (which follows the first audio frame) which is encoded in the frequency domain (or in the transform domain). The first decoded audio information 322 may correspond to the first decoded audio information 222, and the second decoded audio information 332 may correspond to the second decoded audio information 232.

The audio decoder 300 also comprises a transition processor 340, which may correspond, in terms of its overall functionality, to the transition processor 340, and which might provide a modified second decoded audio information 342 on the basis of the second decoded audio information 332.

The transition processor 340 is configured to obtain a combined zero-input response of the linear predictive filter in response to a (combined) initial state of the linear predictive filter defined by a combination of the first decoded audio information and of a modified version of the first decoded audio information, which is provided with an artificial aliasing, and which comprises a contribution of a portion of the second decoded audio information. Moreover, the transition processor is configured to modify the second decoded audio information, which is provided on the basis of an audio frame encoded in the frequency domain following an audio frame encoded in the linear-prediction domain, in dependence on the combined zero-input response, to obtain a smooth transition between the first decoded audio information and the modified second decoded audio information.

For example, the transition processor 340 comprises a modification/aliasing addition/combination 342 which receives the first decoded audio information 322 and the second decoded audio information 332 and provides, on the basis thereof, a combined initial state information 344. For example, the modification/aliasing addition/combination may be considered as an initial state determination. It should also be noted that the modification/aliasing addition/combination 342 may perform the functionality of the initial state determination 242 and of the initial state determination 250. The combined initial state information 344 may, for example, be equal to (or at least correspond to) a sum of the first initial state information 244 and of the second initial state information 252. Accordingly, the modification/aliasing addition/combination 342 may, for example, combine a portion of the first decoded audio information 322 with an artificial aliasing and also with a portion of the second decoded audio information 332. Moreover, the modification/aliasing addition/combination 342 may also modify the portion of the first decoded audio information and/or add a windowed copy of the first decoded audio information 322, as will be described in more detail below. Accordingly, the combined initial state information 344 is obtained.

The transition processor 340 also comprises a linear predictive filtering 346, which receives the combined initial state information 344 and provides, on the basis thereof, a combined zero-input response 348 to a modification 350. The linear predictive filtering 346 may, for example, perform a linear predictive filtering which is substantially identical to a linear predictive filtering which is performed by the linear-prediction decoder 320 to obtain the first decoded audio information 322. However, an initial state of the linear predictive filtering 346 may be determined by the combined initial state information 344. Also, an input signal for providing the combined zero-input response 348 may be set to zero, such that the linear predictive filtering 344 provides a zero-input response on the basis of the combined initial state information 344 (wherein the filtering parameters or filtering coefficients are, for example, identical to the filtering parameters or filtering coefficients used by the linear-prediction domain decoder 320 for providing the first decoded audio information 322 associated with the first audio frame. Moreover, the combined zero-input response 348 is used to modify the second decoded audio information 332, to thereby derive the modified second decoded audio information 342. For example, the modification 350 may add the combined zero-input response 348 to the second decoded audio information 332, or may subtract the combined zero-input response from the second decoded audio information.

However, for further details, reference is made to the explanations of the audio decoders 100, 200, and also to the detailed explanations in the following.

Discussion of the Transition Concept

In the following, some details regarding the transition from a CELP frame to an MDCT frame will be described, which are applicable in the audio decoders 100, 200, 300.

Also, differences when compared to the conventional concepts will be described.

MDCT and Windowing—Overview

In embodiments according to the invention, the aliasing problem is solved by increasing the MDCT length (for example, for an audio frame encoded in the MDCT domain following an audio frame encoded in the linear-prediction-domain) such that the left folding point (for example, of a time domain audio signal reconstructed on the basis of a set of MDCT coefficients using an inverse MDCT transform) is moved at the left of the border between the CELP and the MDCT frames. A left part of the MDCT window (for example, of a window which is applied to a time domain audio signal reconstructed on the basis of a set of MDCT coefficients using an inverse MDCT transform) is also changed (for example, when compared to a "normal" MDCT window), such that the overlap is reduced.

Figure 4A:
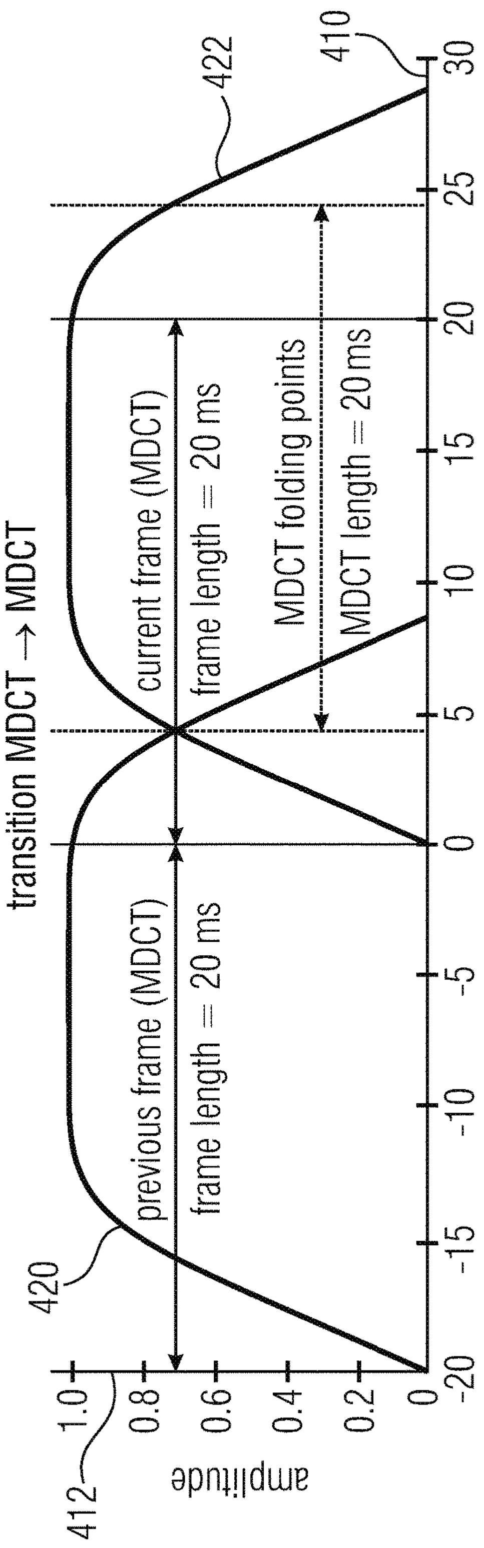
FIG. 4*a* shows a schematic representation of windows at a transition from an MDCT-encoded audio frame to another MDCT encoded audio frame.
Figure 4B:
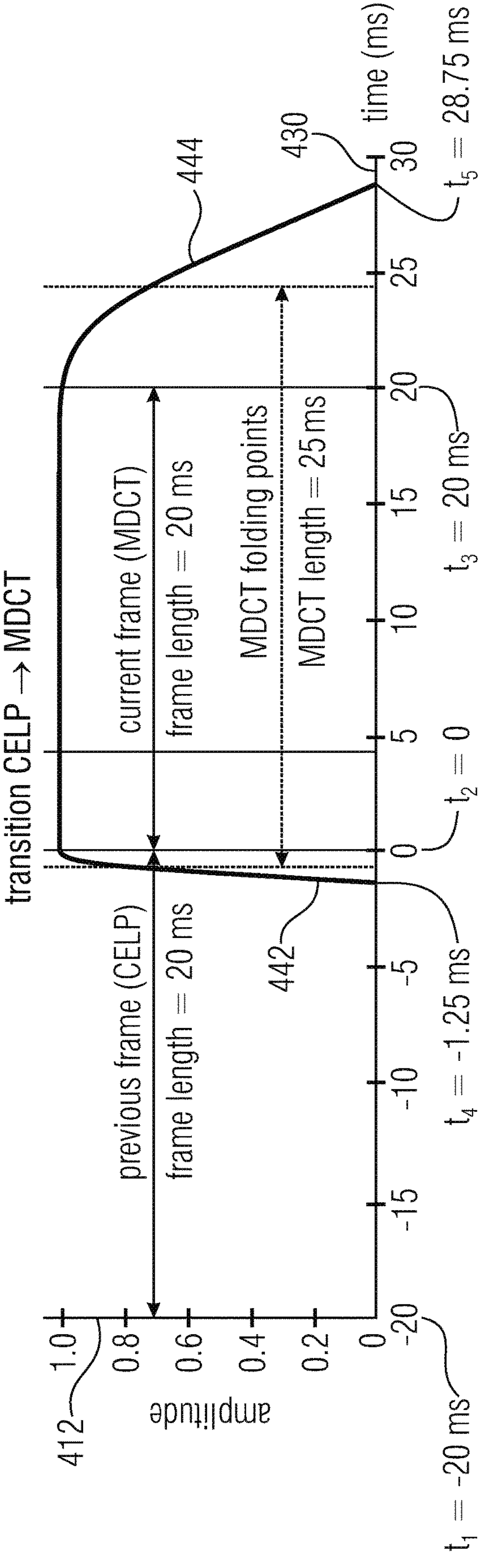
FIG. 4*b* shows a schematic representation of a window used for a transition from a CELP-encoded audio frame to a MDCT encoded audio frame.

As an example, FIGS. 4*a* and 4*b* show a graphic representation of different windows, wherein FIG. 4*a* shows windows for a transition from a first MDCT frame (i.e. a first audio frame encoded in the frequency domain) to another MDCT frame (i.e. a second audio frame encoded in the frequency domain). In contrast, FIG. 4*b* shows a window which is used for a transition from a CELP frame (i.e. a first audio frame encoded in the linear-prediction-domain) to a MDCT frame (i.e. a following, second audio frame encoded in the frequency domain).

In other words, FIG. 4*a* shows a sequence of audio frames which can be considered as a comparison example. In contrast, FIG. 4*b* shows a sequence where a first audio frame is encoded in the linear-prediction-domain and followed by a second audio frame encoded in the frequency domain, wherein the case according to FIG. 4*b* is handled in a particularly advantageous manner by embodiments of the present invention.

Taking reference now to FIG. 4*a*, it should be noted that an abscissa 410 describes a time in milliseconds, and that an ordinate 412 describes an amplitude of the window (e.g., a normalized amplitude of the window) in arbitrary units. As can be seen, a frame length is equal to 20 ms, such that the time period associated with the first audio frame extends between t=−20 ms and t=0. A time period associated with the second audio frame extends from time t=0 to t=20 ms. However, it can be seen that a first window for windowing time domain audio samples provided by an inverse modified discrete cosine transform on the basis of decoded MDCT coefficients, extends between times t=−20 ms and t=8.75 ms. Thus, the length of the first window 420 is longer than the frame length (20 ms). Accordingly, even though the time between t=−20 ms and t=0 is associated to the first audio frame, time domain audio samples are provided on the basis of the decoding of the first audio frame, for times between t=−20 ms and t=8.75 ms. Thus, there is an overlap of approximately 8.75 ms between time domain audio samples provided on the basis of the first encoded audio frame and time domain audio samples provided on the basis of the second decoded audio frame. It should be noted that the second window is designated with 422 and extends between the time t=0 and t=28.75 ms.

Moreover, it should be noted that the windowed time domain audio signals provided for the first audio frame and provided for the second audio frame are not aliasing free. Rather, the windowed (second) decoded audio information provided for the first audio frame comprises aliasing between times t=−20 ms and t=−11.25 ms, and also between times t=0 and t=8.75 ms. Similarly, the windowed decoded audio information provided for the second audio frame comprises aliasing between times t=0 and t=8.75 ms, and also between times t=20 ms and t=28.75 ms. However, for example, the aliasing included in the decoded audio information provided for the first audio frame cancels out with the aliasing included in the decoded audio information provided for the subsequent second audio frame in the time portion between times t=0 and t=8.75 ms.

Moreover, it should be noted that for the windows 420 and 422, a temporal duration between the MDCT folding points is equal to 20 ms, which is equal to the frame length.

Taking reference now to FIG. 4*b*, a different case will be described, namely a window for a transition from a CELP frame to a MDCT frame which may be used in the audio decoders 100,200,300 for providing the second decoded audio information. In FIG. 4*b*, an abscissa 430 describes a time in milliseconds, and an ordinate 432 describes an amplitude of the window in arbitrary units.

As can be seen in FIG. 4*b*, a first frame extends between time $t_1$=−20 ms and time $t_2$=0 ms. Thus, the frame length of the first audio frame, which is a CELP audio frame, is 20 ms. Moreover, a second, subsequent audio frame extends between time $t_2$ and $t_3$=20 ms. Thus, the length of the second audio frame, which is an MDCT audio frame, is also 20 ms.

In the following, some details regarding the window 440 will be described.

A window 440 comprises a first window slope 442, which extends between times $t_4$=−1.25 ms and time $t_2$=0 ms. A second window slope 444 extends between times $t_3$=20 ms and time $t_5$=28.75 ms. It should be noted that the modified discrete cosine transform, which provides the (second) decoded audio information for the (or associated with the) second audio frame provides time domain samples between times $t_4$ and $t_5$. However, the modified discrete cosine transform (or, more precisely, inverse modified discrete cosine transform) (which may be used in the frequency domain decoders 130,230,330 if an audio frame encoded in the frequency domain, for example MDCT domain, follows an audio frame encoded in the linear-prediction-domain) provides time domain samples comprising an aliasing for times between $t_4$ and $t_2$ and for times between time $t_3$ and time $t_5$ on the basis of a frequency domain representation of the second audio frame. In contrast, the inverse modified discrete cosine transform provides aliasing-free time domain samples for a time period between times $t_2$ and $t_3$ on the basis of the frequency domain representation of the second audio frame. Thus, the first window slope 442 is associated with time domain audio samples comprising some aliasing, and the second window slope 444 is also associated with time domain audio samples comprising some aliasing.

Also, it should be noted that the time between the MDCT folding points is equal to 25 ms for the second audio frame, which implies that a number of encoded MDCT coefficients should be larger for the situation shown in FIG. 4*b* than for the situation shown in FIG. 4*a*.

To conclude, the audio decoders 100, 200, 300 may apply the windows 420, 422 (for example, for a windowing of an output of an inverse modified discrete cosine transform in the frequency domain decoder) in the case that both a first audio frame and a second audio frame following the first audio frame are encoded in the frequency domain (for example, in the MDCT domain). In contrast, the audio decoders 100, 200, 300 may switch the operation of the frequency domain decoder in the case that a second audio frame, which follows a first audio frame encoded in the linear-prediction-domain, is encoded in the frequency domain (for example, in the MDCT domain). For example, if the second audio frame is encoded in the MDCT domain and follows a previous first audio frame which is encoded in the CELP domain, an inverse modified discrete cosine transform using an increased number of MDCT coefficients may be used (which implies that an increased number of MDCT coefficients is included, in an encoded form, in the frequency domain representation of an audio frame following a previous audio frame encoded in the linear-prediction-domain, when compared to the frequency domain representation of an encoded audio frame following a previous audio frame encoded also in the frequency domain). Moreover, a different window, namely the window 440, is applied to window the output of the inverse modified discrete cosine transform (i.e. a time domain audio representation provided by the inverse modified discrete cosine transform) to obtain the second decoded audio information 132 in case that the second (current) audio frame encoded in the frequency domain follows an audio frame encoded in the linear-prediction-domain (when compared to the case that the second (current) audio frame follows a previous audio frame also encoded in the frequency domain).

To further conclude, an inverse modified discrete cosine transform having an increased length (when compared to a normal case) may be applied by the frequency domain decoder 130 in case that an audio frame encoded in the frequency domain follows an audio frame encoded in the linear-prediction domain. Moreover, the window 440 may be used in this case (while windows 420, 422 may be used in the "normal" case in which an audio frame encoded in the frequency domain follows a previous audio domain encoded in the frequency domain).

Regarding the inventive concept, it should be noted that the CELP signal is not modified in order to not introduce any additional delay, as will be shown in more detail below. Instead, embodiments according to the invention create a mechanism to remove any discontinuity that could be introduced at the border between the CELP and the MDCT frames. This mechanism smoothens the discontinuity using the zero input response of the CELP synthesis filter (which is used, for example, by the linear-prediction-domain decoder). Details are given in the following.

Step-by-Step Description—Overview

In the following, a short step-by-step description will be provided. Subsequently, more details will be given.

Encoder Side

1. When the previous frame (sometimes also designated with "first frame") is CELP (or, generally, encoded in the linear-prediction-domain), the current MDCT frame (also sometimes designated as "second frame") (which may be considered as an example of a frame encoded in the frequency domain or in the transform domain) is encoded with a different MDCT length and a different MDCT window. For example, the window 440 may be used in this case (rather than the "normal" window 422).
2. The MDCT length is increased (e.g. from 20 ms to 25 ms, confer FIGS. 4*a* and 4*b*) such that the left folding point is moved at the left of the border between the CELP and MDCT frames. For example, the MDCT length (which may be defined by the number of MDCT coefficients) may be chosen such that a length of (or between) the MDCT folding points is equal to 25 ms (as shown in FIG. 4*b*) when compared to the "normal" length between the MDCT folding points of 20 ms (as shown in FIG. 4*a*). It can also be seen that the "left" folding point of the MDCT transform lies between times $t_4$ and $t_2$ (rather than in the middle between times t=0 and t=8.75 ms), which can be seen in FIG. 4*b*. However, the position of the right MDCT folding point may be left unchanged (for example, in the middle between times $t_3$ and $t_5$), which can be seen from a comparison of FIGS. 4*a* and 4*b* (or, more precisely, of windows 422 and 440).
3. The left-part of the MDCT window is changed such that the overlap length is reduced (e.g. from 8.75 ms to 1.25 ms). For example, the portion comprising aliasing lies between times $t_4=-1.25$ ms and $t_2=0$ (i.e. before the time period associated with the second audio frame, which starts at t=0 and ends at t=20 ms) in the case that the previous audio frame is encoded in the linear-prediction-domain. In contrast, the signal portion comprising aliasing lies between times t=0 and t=8.75 ms in the case that the preceding audio frame is encoded in the frequency domain (for example, in the MDCT domain).

Decoder Side

1. When the previous frame (also designated as first audio frame) is CELP (or, generally, encoded in the linear-prediction-domain) the current MDCT frame (also designated as second audio frame) (which is an example for a frame encoded in the frequency domain or transform domain) is decoded with the same MDCT lengths and the same MDCT window as used in the encoder side. Worded differently, the windowing shown in FIG. 4*b* is applied in the provision of the second decoded audio information, and the above mentioned characteristics regarding the inverse modified discrete cosine transform (which correspond to the characteristics of the modified discrete cosine transform used at the side of the encoder) may also apply.
2. To remove any discontinuity that could occur at the border between the CELP and the MDCT frames (for example, at the border between the first audio frame and the second audio frame mentioned above), the following mechanism is used:
   a) A first portion of signal is constructed by artificially introducing the missing aliasing of the overlap-part of the MDCT signal (for example, of the signal portion between times $t_4$ and $t_2$ of the time domain audio signal provided by the inverse modified discrete cosine transform) using the CELP signal (for example, using the first decoded audio information) and an overlap-and-add operation. The length of the first portion of signal is, for example, equal to the overlap length (for example, 1.25 ms).
   b) A second portion of signal is constructed by subtracting the first portion of signal to the corresponding CELP signal (portion located just before the frame border, for example, between the first audio frame and the second audio frame).
   c) A zero input response of the CELP synthesis filter is generated by filtering a frame of zeroes and using the second portion of signal as memory states (or as an initial state).
   d) The zero input response is, for example, windowed such that it decreases to zeroes after a number of samples (e.g. 64).
   e) The windowed zero input response is added to the beginning portion of the MDCT signal (for example, the audio portion starting at time $t_2=0$).

Step-by-Step Description—Detailed Description of the Decoder Functionality

In the following, the functionality of the decoder will be described in more detail.

The following notations will be applied: the frame length is noted N, the decoded CELP signal is noted $S_C(n)$, the decoded MDCT signal (including the windowed overlap signal) is noted $S_M(n)$, the window used for windowing the left-part of the MDCT signal is w(n) with L the window length, and the CELP synthesis filter is noted $$\frac{1}{A(z)} \text{ with } A(z) = \sum_{m=0}^{M} a_m z^{-m}$$

and M the filter order.

Detailed Description of Step 1

After decoder side step 1 (decoding the current MDCT frame with the same MDCT length and the same MDCT window which is used in the encoder side) we get the current decoded MDCT frame (for example, a time domain representation of the "second audio frame" which constitutes the second decoded audio information mentioned above. This frame (for example, the second frame) does not contain any aliasing because the left folding point was moved at the left of the border between the CELP and MDCT frames (for example, using the concept as described in detail taking reference to FIG. 4*b*). This means that we can get perfect reconstruction in the current frame (for example between times $t_2=0$ and $t_3=20$ ms) at sufficiently high bitrate. At low bitrate, however, the signal does not necessarily match the input signal and thus a discontinuity can be introduced at the border between the CELP and MDCT (for example, at time t=0, as shown in FIG. 4*b*).

Figure 5A:
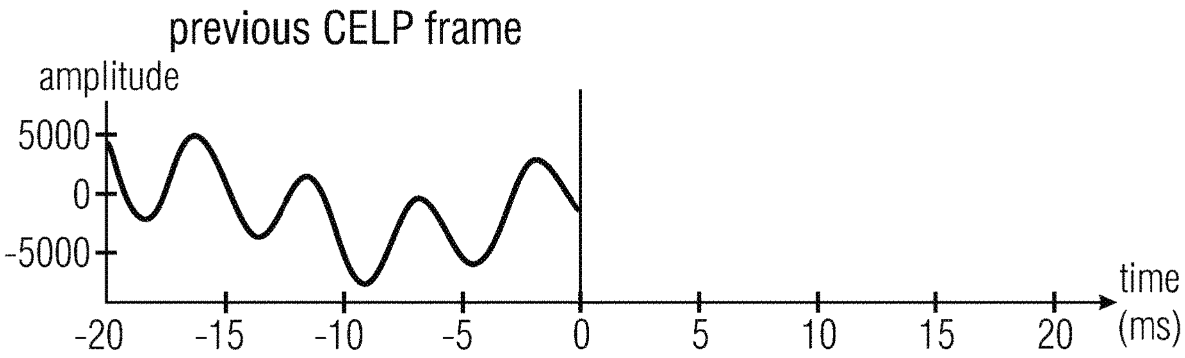
FIGS. 5*a*, 5*b* and 5*c* show a graphic representation of audio signals in a conventional audio decoder.
Figure 5B:
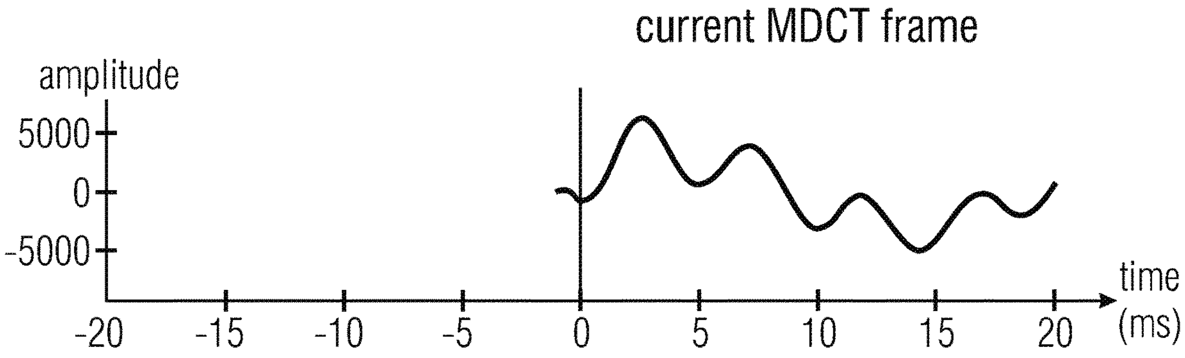
Figure 5C:
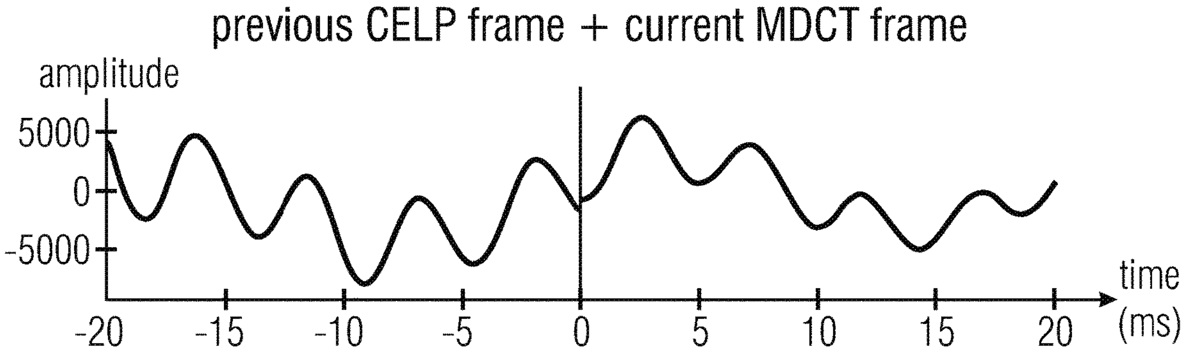

To facilitate the understanding, this problem will be illustrated taking reference to FIG. 5. An upper plot (FIG. 5*a*) shows the decoded CELP signal $S_C(n)$, the middle plot (FIG. 5*b*) shows the decoded MDCT signal (including the windowed overlap signal) $S_M(n)$ and a lower plot (FIG. 5*c*) shows an output signal obtained by discarding the windowed overlap signal and concatenating the CELP frame and the MDCT frame. There is clearly a discontinuity in the output signal (shown in FIG. 5*c*) at the border between the two frames (for example, at time t=0 ms).

Comparison Example of the Further Processing

One possible solution to this problem is the approach proposed in the above mentioned reference 1 ("Efficient cross-fade windows for transitions between LPC-based and non-LPC based audio coding" by J. Lecomte et al.), which describes a concept used in MPEG USAC. In the following, a brief description of said reference approach will be provided.

A second version the decoded CELP signal $\widehat{S_C}(n)$ is first initialized as equal to the decoded CELP signal $$\widehat{S_C}(n)=S_C(n), n=-N, \ldots ,-1$$

then the missing aliasing is artificially introduced in the overlap region $$\widehat{S_C}(n)=S_C(n)w(-n-1)w(-n-1)+S_C(-n-L-1)w(n+L)w(-n-1), n=-L, \ldots ,-1$$

finally, the second version of the decoded CELP signal is obtained using an overlap-and-add operation $$\widehat{S_C}(n)=\widehat{S_C}(n)+S_M(n), n=-L, \ldots ,-1$$

Figure 6A:
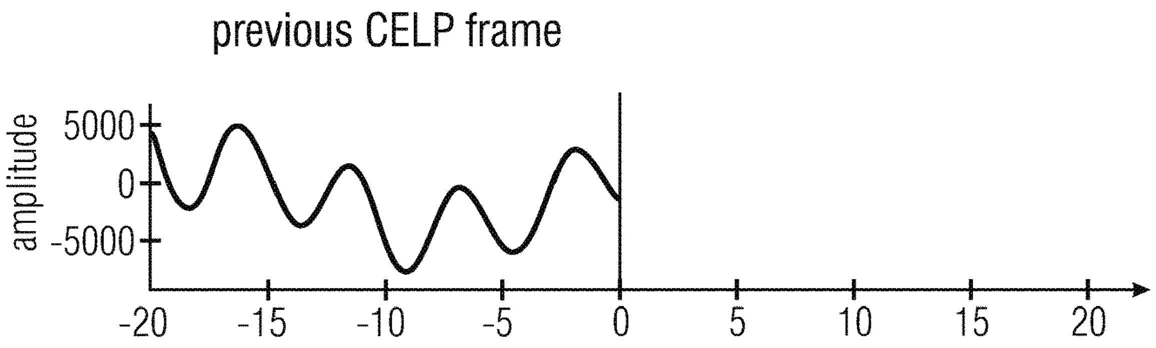
FIGS. 6*a*, 6*b*, 6*c* and 6*d* show a graphic representation of audio signals in a conventional audio decoder.
Figure 6B:
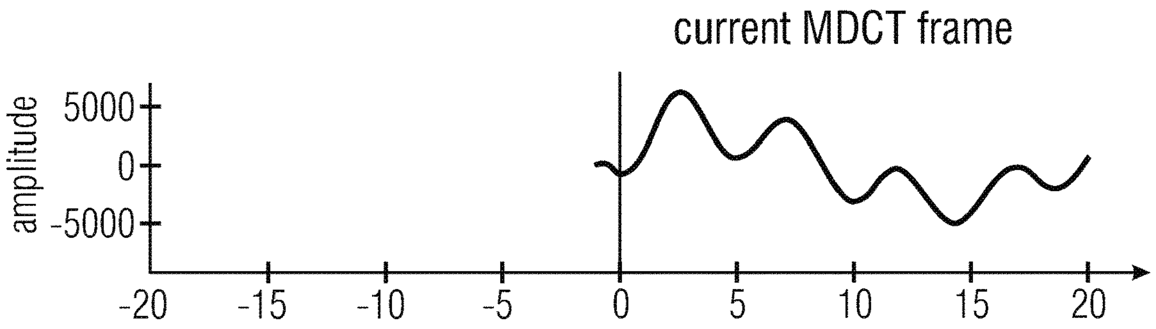
Figure 6C:
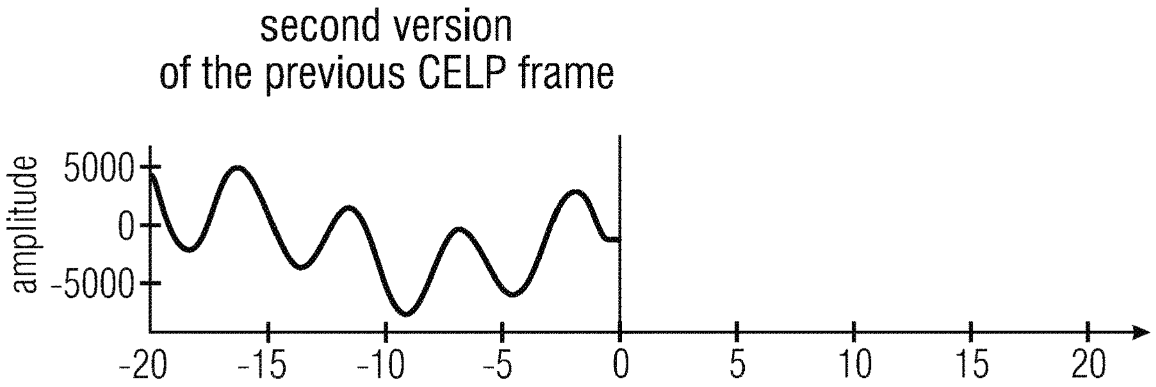
Figure 6D:
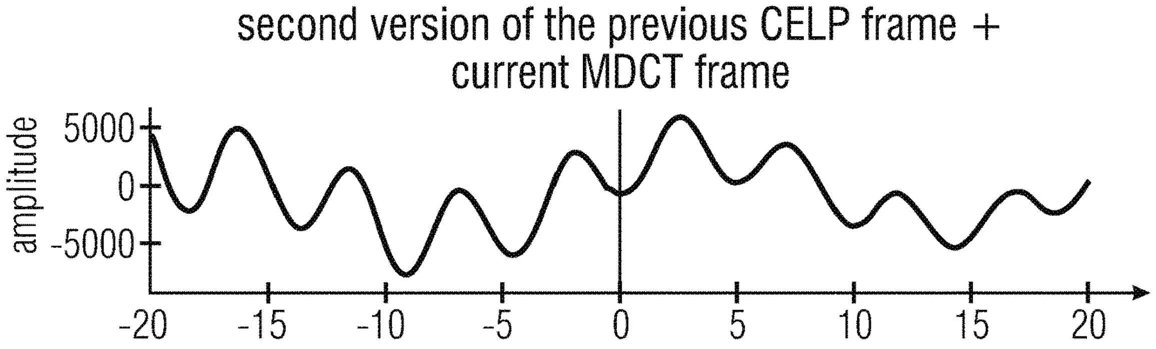

As can be seen in FIGS. 6*a* to 6*d*, this comparison approach removes the discontinuity (see, in particular, FIG. 6*d*). The problem with this approach is that it introduces an additional delay (equal to the overlap length), because the past frame is modified after the current frame has been decoded. In some applications, like low-delay audio coding it is desired (or even necessitated) to have a delay as small as possible.

Detailed Description of the Processing Steps

In contrast to the above mentioned conventional approach, the approach proposed herein to remove the discontinuity does not have any additional delay. It does not modify the past CELP frame (also designated as first audio frame) but instead modifies the current MDCT frame (also designated as second audio frame encoded in the frequency domain following the first audio frame encoded in the linear-prediction-domain).

Step a)

In a first step, a "second version" of the past ACELP frame $\widehat{S_C}(n)$ is computed like described previously. For example, the following computation may be used:

A second version the decoded CELP signal $\widehat{S_C}(n)$ is first initialized as equal to the decoded CELP signal $$\widehat{S_C}(n)=S_C(n), n=-N, \ldots ,-1$$

then the missing aliasing is artificially introduced in the overlap region $$\widehat{S_C}(n)=S_C(n)w(-n-1)w(-n-1)+S_C(-n-L-1)w(n+L)w(-n-1), n=-L, \ldots ,-1$$

finally, the second version of the decoded CELP signal is obtained using an overlap-and-add operation $$\widehat{S_C}(n)=\widehat{S_C}(n)+S_M(n), n=-L, \ldots ,-1$$

However, contrary to reference 1 ("Efficient cross-fade windows for transitions between LPC-based and non-LPC-based audio coding" by J. Lecomte et al.), the past decoded ACELP signal is not replaced by this version of the past ACELP frame, in order to not introduce any additional delay. It is just used as an intermediary signal for modifying the current MDCT frame as described in the next steps.

Worded differently, the initial state determination 144, the modification/aliasing addition/combination 250 or the modification/aliasing addition/combination 342 may, for example, provide the signal $\widehat{S_C}(n)$ as a contribution to the initial state information 146 or to the combined initial state information 344, or as the second initial state information 252. Thus, the initial state determination 144, the modification/aliasing addition/combination 250 or the modification/aliasing addition/combination 342 may, for example, apply a windowing to the decoded CELP signal $S_C$ (multiplication with window values w(−n−1) w (−n−1)), add a time-mirrored version of the decoded CELP signal ($S_C(-n-L-1)$) scaled with a windowing (w(n+L) w(−n−1)) and add the decoded MDCT signal $S_M(n)$, to thereby obtain a contribution to the initial state information 146, 344, or even to obtain the second initial state information 252.

Step b)

The concept also comprises generating two signals by computing the zero input response (ZIR) of the CELP synthesis filter (which can generally be considered as a linear predictive filter) using two different memories (also designated as initial states) for the CELP synthesis filters.

The first $s_Z^1(n)$ is generated by using the previous decoded CELP signal $S_C(n)$ as memories for the CELP synthesis filter.

$$s_Z^1(n)=S_C(n), n=-L, \ldots ,-1$$

$$s_Z^1(n) = -\sum_{m=1}^{M} a_m s_Z^1(n-m),\ n = 0, \ldots , N-1$$

with M≤L

The second $s_Z^2(n)$ is generated by using the second version of the previous decoded CELP signal $\widehat{S_C}(n)$ as memories for the CELP synthesis filter.

$$s_Z^2(n)=\widehat{S_C}(n), n=-L, \ldots ,-1$$

$$s_Z^2(n) = -\sum_{m=1}^{M} a_m s_Z^2(n-m),\ n = 0, \ldots , N-1$$

with M≤L

It should be noted the first zero-input response and the second zero-input response can be computed separately, wherein the first zero-input response can be obtained on the basis of the first decoded audio information (for example, using initial state determination 242 and linear predictive filtering 246) and wherein the second zero-input-response can be computed, for example, using modification/aliasing addition/combination 250, which may provide the "second version of the past CELP frame $\widehat{S_C}(n)$" in dependence on the first decoded audio information 222 and the second decoded audio information 232, and also using the second linear predictive filtering 254. Alternatively, however, a single CELP synthesis filtering may be applied. For example, a linear predictive filtering 148, 346 may be applied, wherein a sum of $S_C(n)$ and $\widehat{S_C}(n)$ is used as an input for said (combined) linear predictive filtering.

This is due to the fact that the linear predictive filtering is a linear operation, such that the combination can be performed either before the filtering or after the filtering without changing the result. However, depending on the signs a difference between $S_C(n)$ and $\widehat{S_C}(n)$ can also be used as an initial state (for $n=-L, \ldots, -1$) of the (combined) linear predictive filtering.

To conclude, the first initial state information $s_Z^1(n)$, $n=-L, \ldots, -1$ and the second initial state information $s_Z^2(n)$, $n=-L, \ldots, -1$ can be obtained either individually or in a combined manner. Also, the first and second zero-input responses can be obtained either by an individual linear predictive filtering of individual initial state information, or using a (combined) linear predictive filtering on the basis of a combined initial state information.

As shown in the plots of FIG. 7, which will be explained in detail in the following, $S_C(n)$ and $s_Z^1(n)$ are continuous, $\widehat{S_C}(n)$ and $s_Z^2(n)$ are continuous. Moreover, as $\widehat{S_C}(n)$ and $S_M(n)$ are also continuous, $S_M(n)-s_Z^2(n)$ is a signal which starts from a value very close to 0.

Taking reference now to FIG. 7, some details will be explained.

Figure 7A:
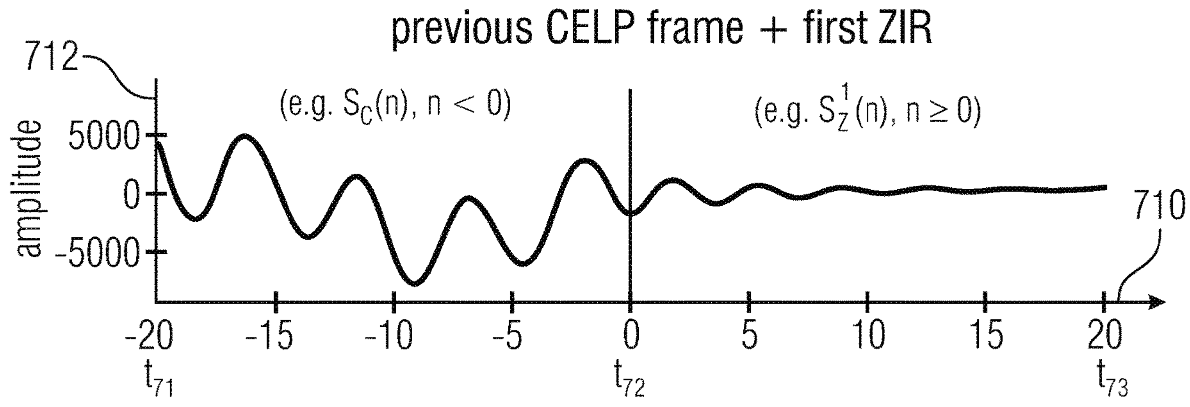
FIG. 7*a* shows a graphic representation of an audio signal obtained on the basis of a previous CELP frame and of a first zero-input response.

FIG. 7*a* shows a graphic representation of a previous CELP frame and of a first zero input response. An abscissa 710 describes a time in milliseconds and an ordinate 712 describe an amplitude in arbitrary units.

For example, an audio signal provided for the previous CELP frame (also designated as first audio frame) is shown between times $t_{71}$ and $t_{72}$. For example, the signal $S_C(n)$ for $n<0$ may be shown between times $t_{71}$ and $t_{72}$. Moreover, the first zero input response may be shown between times $t_{72}$ and $t_{73}$. For example, the first zero input response $s_Z^1(n)$ may be shown between times $t_{72}$ and $t_{73}$.

Figure 7B:
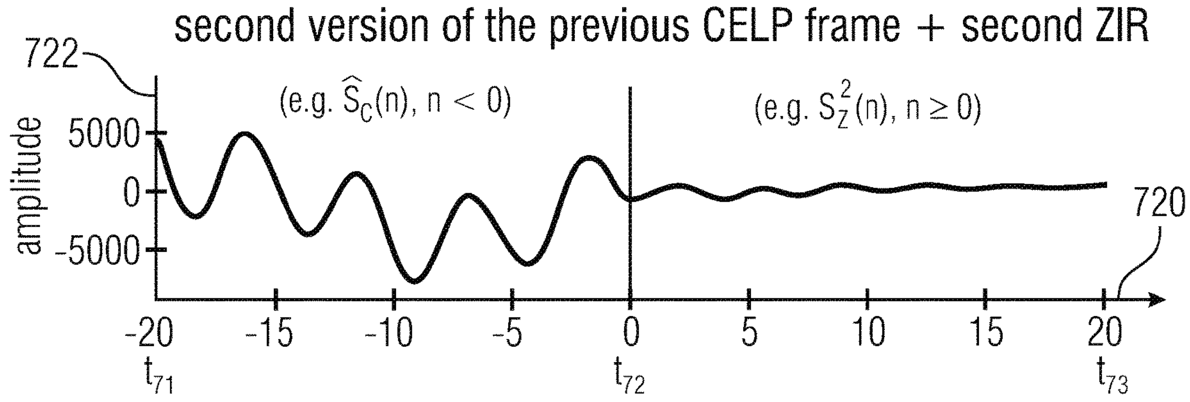
FIG. 7*b* shows a graphic representation of an audio signal, which is a second version of the previous CELP frame, and of a second zero-input response.

FIG. 7*b* shows a graphic representation of the second version of the previous CELP frame and the second zero input response. An abscissa is designated with 720, and shows the time in milliseconds. An ordinate is designated with 722 and shows an amplitude in arbitrary units. A second version of the previous CELP frame is shown between times $t_{71}$ (−20 ms) and $t_{72}$ (0 ms), and a second zero input response is shown between times $t_{72}$ and $t_{73}$ (+20 ms). For example, the signal $\widehat{S_C}(n)$, $n<0$, is shown between times $t_{71}$ and $t_{72}$. Moreover, the signal $s_Z^2(n)$ for $n\geq 0$ is shown between times $t_{72}$ and $t_{73}$.

Figure 7C:
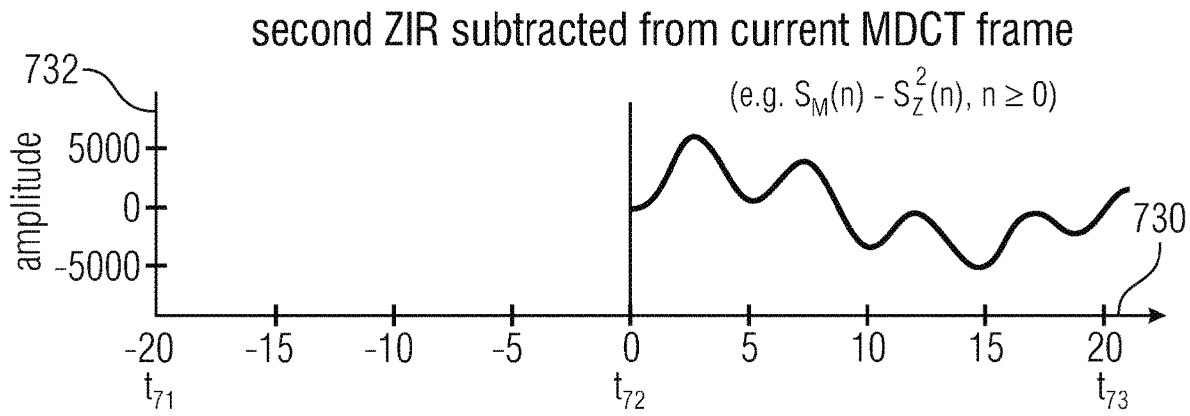
FIG. 7*c* shows a graphic representation of an audio signal which is obtained if the second zero-input response is subtracted from the audio signal of the current MDCT frame.

Moreover, the difference between $S_M(n)$ and $s_Z^2(n)$ is shown in FIG. 7*c*, wherein an abscissa 730 designates a time in milliseconds and wherein an ordinate 732 designates an amplitude in arbitrary units.

Moreover, it should be noted that the first zero input response $s_Z^1(n)$ for $n\geq 0$ is a (substantially) steady continuation of the signal $S_C(n)$ for $n<0$. Similarly, the second zero input response $s_Z^2(n)$ for $n\geq 0$ is a (substantially) steady continuation of the signal $\widehat{S_C}(n)$ for $n<0$.

Step c)

The current MDCT signal (for example, the second decoded audio information 132, 232, 332) is replaced by a second version 142, 242, 342 of the current MDCT (i.e. of the MDCT signal associated with the current, second audio frame).

$$\widehat{S_M}(n)=S_M(n)-s_Z^2(n)+s_Z^1(n)$$

It is then straightforward to show that $S_C(n)$ and $\widehat{S_M}(n)$ are continuous: $S_C(n)$ and $s_Z^1(n)$ are continuous, $S_M(n)-s_Z^2(n)$ starts from a value very close to 0.

For example, $\widehat{S_M}(n)$ may be determined by the modification 152, 258, 350 in dependence on the second decoded audio information 132, 232, 323 and in dependence on the first zero input response $s_Z^1(n)$ and the second zero input response $s_Z^2(n)$ (for example as shown in FIG. 2), or in dependence on a combined zero-input response (for example, combined zero input response $s_Z^1(n)-s_Z^2(n)$, 150, 348). As can be seen in the plots of FIG. 8, the proposed approach removes the discontinuity.

Figure 8A:
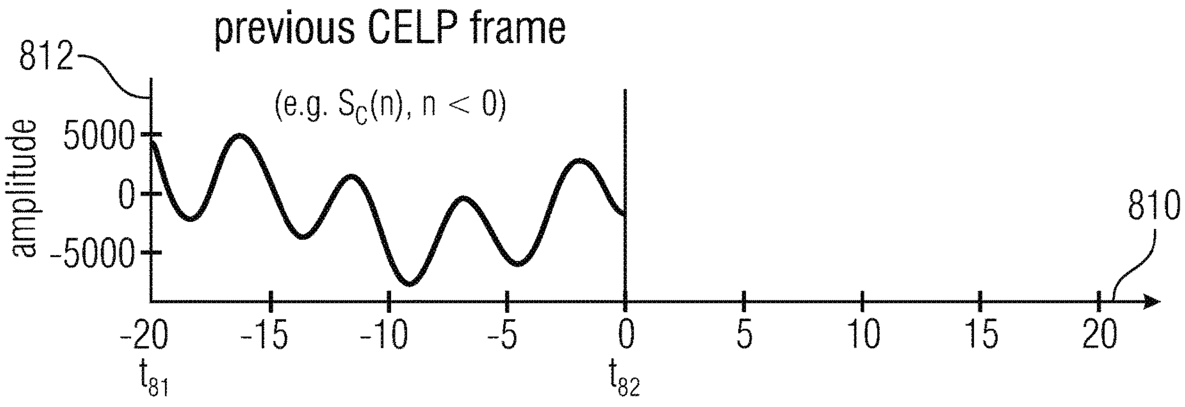
FIG. 8*a* shows a graphic representation of an audio signal obtained on the basis of a previous CELP frame.

For example, FIG. 8*a* shows a graphic representation of the signals for the previously CELP frame (for example, of the first decoded audio information), wherein an abscissa 810 describes a time in milliseconds, and wherein an ordinate 812 describes an amplitude in arbitrary units. As can be seen, the first decoded audio information is provided (for example, by the linear-prediction-domain decoding) between times $t_{81}$ (−20 ms) and $t_{82}$ (0 ms).

Figure 8B:
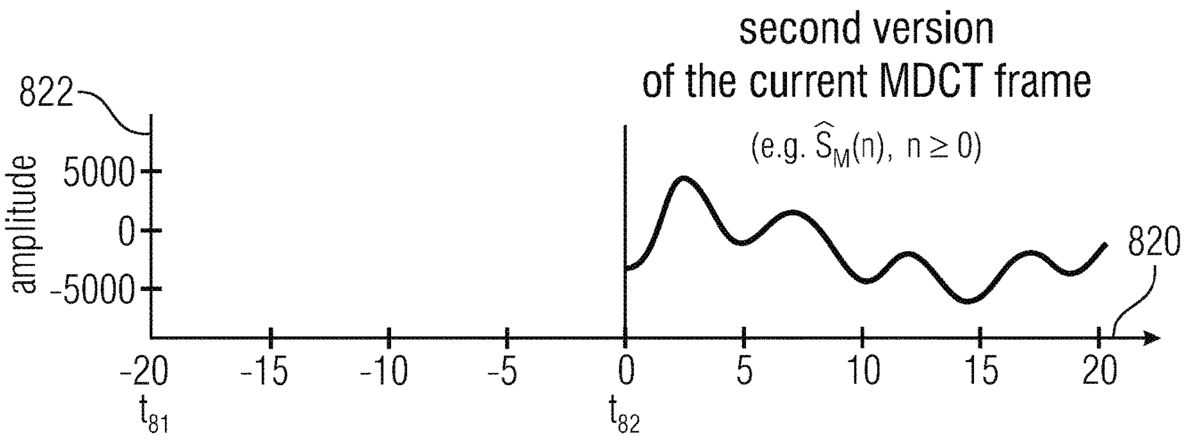
FIG. 8*b* shows a graphic representation of an audio signal, which is obtained as a second version of the current MDCT frame.

Moreover, as can be seen in FIG. 8*b*, the second version of the current MDCT frame (for example, the modified second decoded audio information 142, 242, 342) is provided starting only from time $t_{82}$ (0 ms), even though the second decoded audio information 132, 232, 332 is typically provided starting from time $t_4$ (as shown in FIG. 4*b*). It should be noted that the second decoded audio information 132, 232, 332 provided between times $t_4$ and $t_2$ (as shown in FIG. 4*b*) is not used directly for the provision of the second version of the current MDCT frame (signal $\widehat{S_M}(n)$) but is merely used for the provision of signal components $s_Z^2(n)$. For the sake of clarity, it should be noted that an abscissa 820 designates the time in milliseconds, and that an ordinate 822 designates an amplitude in terms of arbitrary units.

Figure 8C:
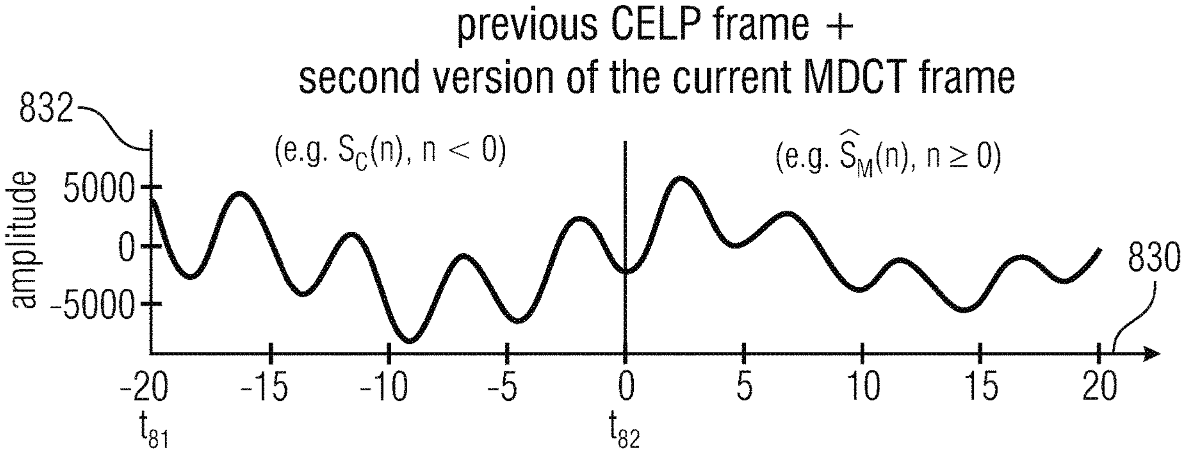
FIG. 8*c* shows a graphic representation of an audio signal, which is a combination of the audio signal obtained on the basis of the previous CELP frame and of the audio signal which is the second version of the MDCT frame.

FIG. 8*c* shows a concatenation of the previous CELP frame (as shown in FIG. 8*a*) and of the second version of the current MDCT frame (as shown in FIG. 8*b*). An abscissa 830 describes a time in milliseconds, and an ordinate 832 describes an amplitude in terms of arbitrary units. As can be seen, there is a substantially continuous transition between the previous CELP frame (between times $t_{81}$ and $t_{82}$ and the second version of the current MDCT frame (starting at time $t_{82}$ and ending, for example, at time $t_5$, a shown in FIG. 4*b*). Thus, audible distortions at a transition from the first frame (which is encoded in the linear-prediction domain) to the second frame (which is encoded in the frequency domain) are avoided.

It is also straightforward to show that perfect reconstruction is achieved at high-rate: at high-rate $S_C(n)$ and $\widehat{S_C}(n)$ are very similar and both are very similar to the input signal, then the two ZIR are very similar, consequently the difference of the two ZIR is very close to 0 and finally $\widehat{S_M}(n)$ is very similar to $S_M(n)$ and both are very similar to the input signal.

Step d)

Optionally, a window can be applied to the two ZIR, in order to not affect the entire current MDCT frame. This is useful e.g. to reduce the complexity, or if the ZIR is not close to 0 at the end of the MDCT frame.

One example of window is a simple linear window $v(n)$ of length P $$v(n) = \frac{P-n}{P}, n = 0, \ldots, P-1$$

with e.g. P=64.

For example, the window may process the zero-input response 150, the zero-input responses 248, 256 or the combined zero-input response 348.

Figure 9:
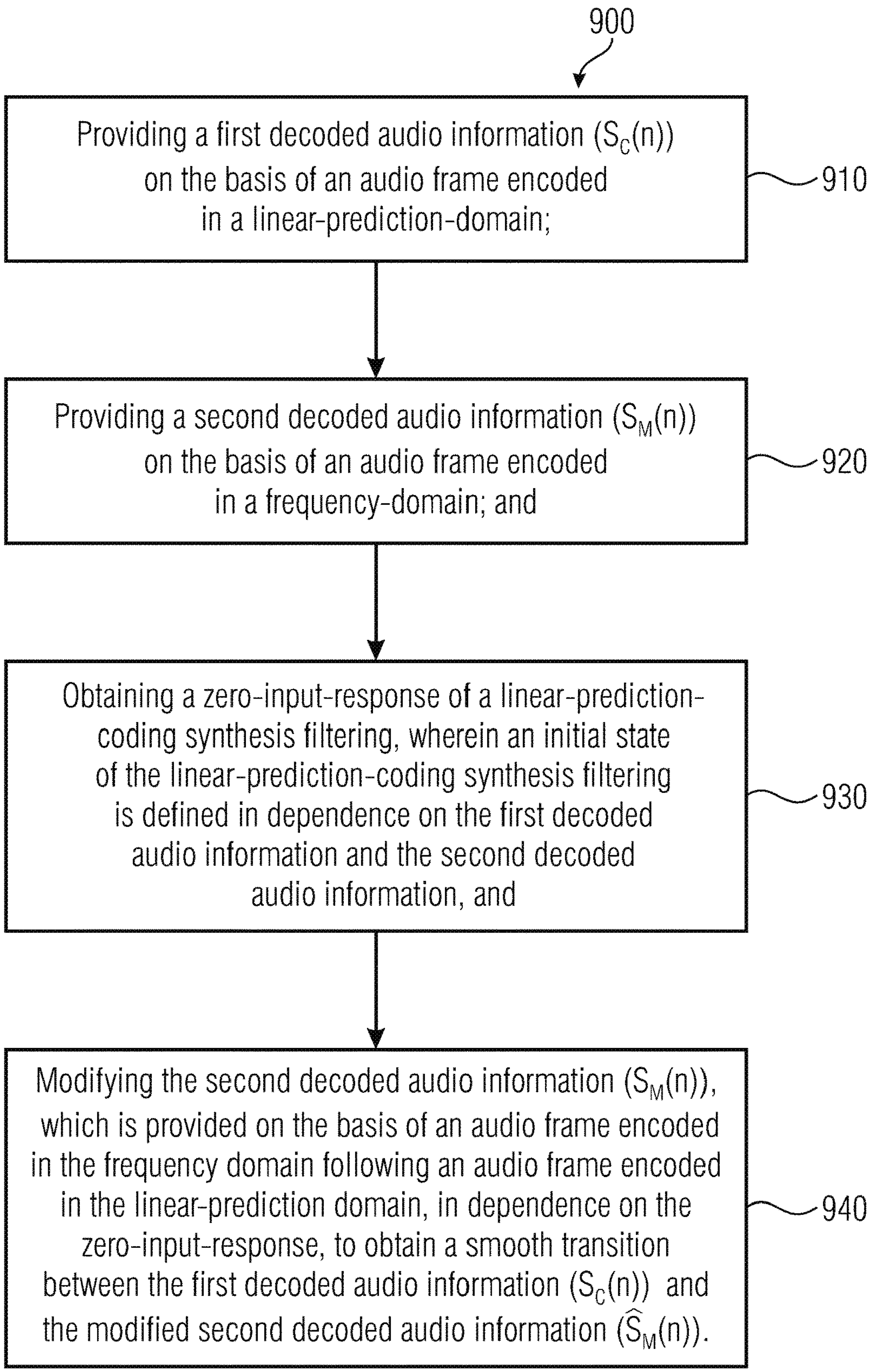
FIG. 9 shows a flow chart of a method for providing a decoded audio information, according to an embodiment of the present invention.

Method According to FIG. 9

FIG. 9 shows a flowchart of method for providing a decoded audio information on the basis of an encoded audio information. The method 900 comprises providing 910 a first decoded audio information on the basis of an audio frame encoded in a linear-prediction-domain. The method 900 also comprises providing 920 a second decoded audio information on the basis of an audio frame encoded in a frequency-domain. The method 900 also comprises obtaining 930 a zero-input response of a linear predictive filtering, wherein an initial state of the linear predictive filtering is defined in dependence on the first decoded audio information and the second decoded audio information.

The method 900 also comprises modifying 940 the second decoded audio information, which is provided on the basis of an audio frame encoded in the frequency domain following an audio frame encoded in the linear-prediction domain, in dependence on the zero-input response, to obtain a smooth transition between the first decoded audio information and the modified second decoded audio information.

The method 900 can be supplemented by any of the features and functionalities described herein, also with respect to the audio decoders.

Figure 10:
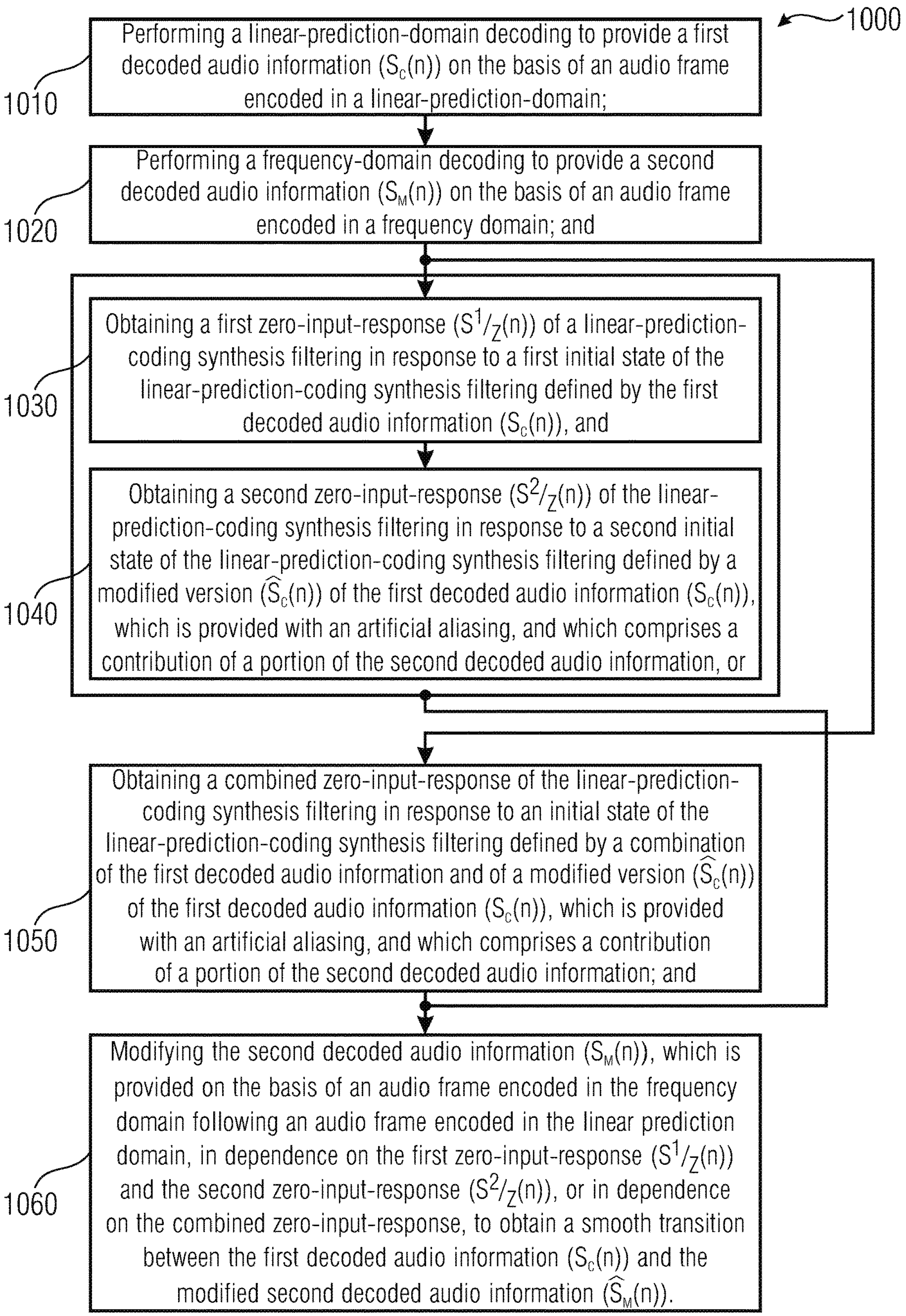
FIG. 10 shows a flow chart of a method for providing a decoded audio information, according to another embodiment of the present invention.

Method According to FIG. 10

FIG. 10 shows a flowchart of a method 1000 for providing a decoded audio information on the basis of an encoded audio information. T The method 1000 comprises performing 1010 a linear-prediction-domain decoding to provide a first decoded audio information on the basis of an audio frame encoded in a linear-prediction-domain.

The method 1000 also comprises performing 1020 a frequency-domain decoding to provide a second decoded audio information on the basis of an audio frame encoded in a frequency domain.

The method 1000 also comprises obtaining 1030 a first zero input response of a linear predictive filtering in response to a first initial state of the linear predictive filtering defined by the first decoded audio information and obtaining 1040 a second zero-input response of the linear predictive filtering in response to a second initial state of the linear predictive filtering defined by a modified version of the first decoded audio information, which is provided with an artificial aliasing, and which comprises a contribution of a portion of the second decoded audio information.

Alternatively, the method 1000 comprises obtaining 1050 a combined zero-input response of the linear predictive filtering in response to an initial state of the linear predictive filtering defined by a combination of the first decoded audio information and of a modified version of the first decoded audio information, which is provided with an artificial aliasing, and which comprises a contribution of a portion of a second decoded audio information.

The method 1000 also comprises modifying 1060 the second decoded audio information, which is provided on the basis of an audio frame encoded in the frequency domain following an audio frame encoded in the linear prediction domain, in dependence on the first zero-input response and the second zero-input response, or in dependence on the combined zero-input response, to obtain a smooth transition between the first decoded audio information and the modified second decoded audio information.

It should be noted that the method 1000 can be supplemented by any of the features and functionalities described herein, also with respect to the audio decoders.

CONCLUSIONS

To conclude, embodiments according to the invention are related to the CELP-to-MDCT transitions. These transitions generally introduce two problems:

1. Aliasing due to the missing previous MDCT frame; and
2. Discontinuity at the border between the CELP frame and the MDCT frame, due to the non-perfect waveform coding nature of the two coding schemes operating at low/medium bitrates.

In embodiments according to the invention, the aliasing problem is solved by increasing the MDCT length such that the left folding point is moved at the left of the border between the CELP and the MDCT frames. The left part of the MDCT window is also changed such that the overlap is reduced. Contrary to the conventional solutions, the CELP signal is not modified in order to not introduce any additional delay. Instead, a mechanism is created to remove any discontinuity that could be introduced at the border between the CELP and the MDCT frames. This mechanism smoothens the discontinuity using the zero input response of the CELP synthesis filters. Additional details are described herein.

Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An audio decoder for providing a decoded audio information on the basis of an encoded audio information, the audio decoder comprising:

a linear-prediction-domain decoder configured to provide a first decoded audio information on the basis of an audio frame encoded in a linear prediction domain;

a frequency domain decoder configured to provide a second decoded audio information on the basis of an audio frame encoded in a frequency domain; and a transition processor, wherein the transition processor is configured to obtain a zero-input-response of a linear predictive filtering, wherein an initial state of the linear predictive filtering is defined in dependence on the first decoded audio information, and wherein the transition processor is configured to modify the second decoded audio information, which is provided on the basis of an audio frame encoded in the frequency domain following an audio frame encoded in the linear prediction domain, in dependence on the zero-input-response, wherein the audio decoder is implemented using a hardware apparatus, or using a computer, or using a combination of a hardware apparatus and a computer.

2. The audio decoder according to claim 1, wherein the transition processor is configured to obtain a first zero-input-response of a linear predictive filter in response to a first initial state of the linear predictive filter defined by the first decoded audio information, and wherein the transition processor is configured to obtain a second zero-input-response of the linear predictive filter in response to a second initial state of the linear predictive filter defined by a modified version of the first decoded audio information, which is provided with an artificial aliasing, and which comprises a contribution of a portion of the second decoded audio information, or wherein the transition processor is configured to obtain a combined zero-input-response of the linear predictive filter in response to an initial state of the linear predictive filter defined by a combination of the first decoded audio information and of a modified version of the first decoded audio information, which is provided with an artificial aliasing, and which comprises a contribution of a portion of the second decoded audio information;

wherein the transition processor is configured to modify the second decoded audio information, which is provided on the basis of an audio frame encoded in the frequency domain following an audio frame encoded in the linear prediction domain, in dependence on the first zero-input-response and the second zero-input-response, or in dependence on the combined zero-input-response, to obtain a smooth transition between the first decoded audio information and the modified second decoded audio information.

3. The audio decoder according to claim 1, wherein the frequency-domain decoder is configured to perform an inverse lapped transform, such that the second decoded audio information comprises an aliasing.

4. The audio decoder according to claim 1, wherein the frequency-domain decoder is configured to perform an inverse lapped transform, such that the second decoded audio information comprises an aliasing in a time portion which is temporally overlapping with a time portion for which the linear-prediction-domain decoder provides a first decoded audio information, and such that the second decoded audio information is aliasing-free for a time portion following the time portion for which the linear-prediction-domain decoder provides a first decoded audio information.

5. The audio decoder according to claim 1, wherein the portion of the second decoded audio information, which is used to obtain the modified version of the first decoded audio information, comprises an aliasing.

6. The audio decoder according to claim 5, wherein the artificial aliasing, which is used to obtain the modified version of the first decoded audio information, at least partially compensates an aliasing which is comprised in the portion of the second decoded audio information, which is used to obtain the modified version of the first decoded audio information.

7. The audio decoder according to claim 1, wherein the transition processor is configured to obtain the first zero-input-response, or a first component of the combined zero-input-response, according to $$s_Z^1(n) = -\sum_{m=1}^{M} a_m s_Z^1(n-m),\ n = 0, \ldots, N-1$$

or according to $$s_Z^1(n) = +\sum_{m=1}^{M} a_m s_Z^1(n-m),\ n = 0, \ldots, N-1$$

with $$s_Z^1(n)=S_C(n), n=-L, \ldots, -1$$

$$M \le L$$

wherein n designates a time index, wherein $s_Z^1(n)$ for n=0, . . . , N−1 designates the first zero input response for time index n, or a first component of the combined zero-input-response for time index n;

wherein $s_Z^1(n)$ for n=−L, . . . , −1 designates the first initial state for time index n, or a first component of the initial state for time index n;

wherein m designates a running variable, wherein M designates a filter length of the linear predictive filter;

wherein $a_m$ designates filter coefficients of the linear predictive filter;

wherein $S_c(n)$ designates a previously decoded value of the first decoded audio information for time index n;

wherein N designates a processing length.

8. The audio decoder according to claim 1, wherein the transition processor is configured to apply a first windowing to the first decoded audio information, to obtain a windowed version of the first decoded audio information, and to apply a second windowing to a time-mirrored version of the first decoded audio information, to obtain a windowed version of the time-mirrored version of the first decoded audio information, and wherein the transition processor is configured to combine the windowed version of the first decoded audio information and the windowed version of the time-mirrored version of the first decoded audio information, in order to obtain the modified version of the first decoded audio information.

9. The audio decoder according to claim 1, wherein the transition processor is configured to obtain the modified version of the first decoded audio information according to $$\tilde{S}_C(n)=S_C(n)w(-n-1)w(-n-1)+S_C(-n-L-1)w(n+L)w(-n-1)+S_M(n), n=-L, \ldots, -1,$$

wherein n designates a time index, wherein w(−n−1) designates a value of a window function for time index (−n−1);

wherein w(n+L) designates a value of a window function for time index (n+L);

wherein $S_c(n)$ designates a previously decoded value of the first decoded audio information for time index (n);

wherein $S_c(-n-L-1)$ designates a previously decoded value of the first decoded audio information for time index (−n−L−1);

wherein $S_M(n)$ designates a decoded value of the second decoded audio information for time index n; and wherein L describes a length of a window.

10. The audio decoder according to claim 1, wherein the transition processor is configured to obtain the second zero-input-response, or a second component of the combined zero-input-response according to $$s_Z^2(n) = -\sum_{m=1}^{M} a_m s_Z^2(n-m),\ n = 0, \ldots, N-1$$

or according to $$s_Z^2(n) = +\sum_{m=1}^{M} a_m s_Z^2(n-m),\ n = 0, \ldots, N-1$$

with $$s_Z^2(n)=\tilde{S}_C(n), n=-L, \ldots, -1$$

$$M \le L$$

wherein n designates a time index, wherein $s_Z^2(n)$ for n=0, . . . , N−1 designates the second zero input response for time index n, or a second component of the combined zero-input-response for time index n;

wherein $s_Z^2(n)$ for n=−L, . . . , −1 designates the second initial state for time index n, or a second component of the initial state for time index n;

wherein m designates a running variable, wherein M designates a filter length of the linear predictive filter;

wherein $a_m$ designates filter coefficients of the linear predictive filter;

wherein $\tilde{S}_C(n)$ designates values of the modified version of the first decoded audio information for time index n;

wherein N designates a processing length.

11. The audio decoder according to claim 1, wherein the transition processor is configured to linearly combine the second decoded audio information with the first zero-input-response and the second zero-input-response, or with the combined zero-input-response, for a time portion for which no first decoded audio information is provided by the linear-prediction-domain decoder, in order to obtain the modified second decoded audio information.

12. The audio decoder according to claim 1, wherein the transition processor is configured to obtain the modified second decoded audio information according to $$\tilde{S}_M(n)=S_M(n)-s_Z^2(n)+s_Z^1(n), \text{ for } n=0, \ldots, N-1,$$

or according to $$\tilde{S}_M(n)=S_M(n)-v(n)s_Z^2(n)+v(n)s_Z^1(n), \text{ for } n=0, \ldots, N-1,$$

wherein wherein n designates a time index;

wherein $S_M(n)$ designates values of the second decoded audio information for time index n;

wherein $s_Z^1(n)$ for n=0, . . . , N−1 designates the first zero input response for time index n, or a first component of the combined zero-input-response for time index n; and wherein $s_Z^2(n)$ for n=0, . . . , N−1 designates the second zero input response for time index n, or a second component of the combined zero-input-response for time index n;

wherein v(n) designates values of a window function;

wherein N designates a processing length.

13. The audio decoder according to claim 1, wherein the transition processor is configured to leave the first decoded audio information unchanged by the second decoded audio information when providing a decoded audio information for an audio frame encoded in a linear-prediction domain, such that the decoded audio information provided for an audio frame encoded in the linear-prediction-domain is provided independent from decoded audio information provided for a subsequent audio frame encoded in the frequency domain.

14. The audio decoder according to claim 1, wherein the audio decoder is configured to provide a fully decoded audio information for an audio frame encoded in the linear-prediction domain, which is followed by an audio frame encoded in the frequency domain, before decoding the audio frame encoded in the frequency domain.

15. The audio decoder according to claim 1, wherein the transition processor is configured to window the first zero-input-response and the second zero-input-response, or the combined zero-input-response, before modifying the second decoded audio information in dependence on the windowed first zero-input-response and the windowed second zero-input-response, or in dependence on the windowed combined zero-input-response.

16. The audio decoder according to claim 15, wherein the transition processor is configured to window the first zero-input-response and the second zero-input-response, or the combined zero-input-response, using a linear window.

17. A method for providing a decoded audio information on the basis of an encoded audio information, the method comprising:

providing a first decoded audio information on the basis of an audio frame encoded in a linear prediction domain;

providing a second decoded audio information on the basis of an audio frame encoded in a frequency domain; and obtaining a zero-input-response of a linear predictive filtering, wherein an initial state of the linear predictive filtering is defined in dependence on the first decoded audio information, and modifying the second decoded audio information, which is provided on the basis of an audio frame encoded in the frequency domain following an audio frame encoded in the linear prediction domain, in dependence on the zero-input-response, wherein the method is performed using a hardware apparatus, or using a computer, or using a combination of a hardware apparatus and a computer.

18. A non-transitory digital storage medium having a computer program stored thereon to perform the method for providing a decoded audio information on the basis of an encoded audio information, the method comprising:

providing a first decoded audio information on the basis of an audio frame encoded in a linear prediction domain;

providing a second decoded audio information on the basis of an audio frame encoded in a frequency domain; and obtaining a zero-input-response of a linear predictive filtering, wherein an initial state of the linear predictive filtering is defined in dependence on the first decoded audio information, and modifying the second decoded audio information, which is provided on the basis of an audio frame encoded in the frequency domain following an audio frame encoded in the linear prediction domain, in dependence on the zero-input-response, when said computer program is run by a computer.

* * * * *